United States Patent
Xiao et al.

(10) Patent No.: US 12,455,688 B2
(45) Date of Patent: Oct. 28, 2025

(54) MEMORY MANAGEMENT TECHNOLOGY AND COMPUTER SYSTEM

(71) Applicant: Huawei Technologies Co., Ltd., Shenzhen (CN)

(72) Inventors: Shihai Xiao, Hangzhou (CN); Chuanzeng Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 202 days.

(21) Appl. No.: 18/154,532

(22) Filed: Jan. 13, 2023

(65) Prior Publication Data

US 2023/0152977 A1  May 18, 2023

Related U.S. Application Data

(63) Continuation of application No. PCT/CN2021/093982, filed on May 15, 2021.

(30) Foreign Application Priority Data

Jul. 17, 2020  (CN) .......................... 202010693280.4
Oct. 28, 2020  (CN) .......................... 202011176594.3

(51) Int. Cl.
  *G06F 3/00*  (2006.01)
  *G06F 3/06*  (2006.01)
  *G06F 12/02*  (2006.01)
(52) U.S. Cl.
  CPC .......... *G06F 3/0611* (2013.01); *G06F 3/0653* (2013.01); *G06F 3/0659* (2013.01); *G06F 3/0673* (2013.01); *G06F 12/0215* (2013.01); *G06F 2212/1024* (2013.01)

(58) Field of Classification Search
  CPC ..................... G06F 12/0215; G06F 2212/1024
  See application file for complete search history.

(56) References Cited

U.S. PATENT DOCUMENTS

| | | |
|---|---|---|
| 5,889,714 A | 3/1999 | Schumann et al. |
| 6,212,598 B1 | 4/2001 | Jeddeloh |
| 6,219,764 B1 | 4/2001 | Jeddeloh |
| 6,219,765 B1 * | 4/2001 | Jeddeloh ............. G06F 12/0215 |
| | | 711/E12.004 |
| 6,799,241 B2 | 9/2004 | Kahn et al. |
| (Continued) | | |

FOREIGN PATENT DOCUMENTS

| | | |
|---|---|---|
| CN | 1284086 C | 11/2006 |
| CN | 101488117 A | 7/2009 |
| (Continued) | | |

OTHER PUBLICATIONS

Ghasempour, M., et al., "HAPPY: Hybrid Address-based Page Policy in DRAMs," MEMSYS Oct. 3-6, 2016, 2016, Washington, DC, USA, 11 pages.

*Primary Examiner* — Reginald G Bragdon
*Assistant Examiner* — Michael L Westbrook
(74) *Attorney, Agent, or Firm* — Conley Rose, P.C.

(57) ABSTRACT

A memory management technology may be applied to a computer system including a dynamic random-access (DRAM). According to the memory management technology, a corresponding row management policy may be executed based on an access type of memory access, where the access type of the memory access includes a read access or a write access.

20 Claims, 15 Drawing Sheets

(56) References Cited

U.S. PATENT DOCUMENTS

| | | | |
|---|---|---|---|
| 7,076,617 B2 | 7/2006 | Dodd | |
| 7,127,573 B1 * | 10/2006 | Strongin | G06F 13/1626 |
| | | | 711/158 |
| 7,133,995 B1 * | 11/2006 | Isaac | G06F 12/0215 |
| | | | 711/204 |
| 2005/0060533 A1 | 3/2005 | Woo et al. | |
| 2009/0157985 A1 * | 6/2009 | Stevens | G06F 13/1668 |
| | | | 711/E12.001 |
| 2012/0059983 A1 * | 3/2012 | Nellans | G06F 12/0215 |
| | | | 711/E12.001 |
| 2012/0297131 A1 * | 11/2012 | Chung | G06F 12/0215 |
| | | | 711/E12.001 |
| 2013/0073812 A1 | 3/2013 | Kanai et al. | |

FOREIGN PATENT DOCUMENTS

| | | |
|---|---|---|
| CN | 101071403 B | 12/2010 |
| CN | 103810123 A | 5/2014 |
| CN | 106095698 A | 11/2016 |
| CN | 107274926 A | 10/2017 |
| CN | 105229743 B | 2/2018 |
| CN | 108959106 A | 12/2018 |
| CN | 111240582 A | 6/2020 |
| CN | 111258925 A | 6/2020 |

* cited by examiner

MEMORY MANAGEMENT TECHNOLOGY AND COMPUTER SYSTEM

CROSS-REFERENCE TO RELATED APPLICATIONS

This is a continuation of International Patent Application No. PCT/CN2021/093982 filed on May 15, 2021, which claims priority to Chinese Patent Application No. 202011176594.3 filed on Oct. 28, 2020 and Chinese Patent Application No. 202010693280.4 filed on Jul. 17, 2020. All of the aforementioned patent applications are hereby incorporated by reference in their entireties.

TECHNICAL FIELD

This disclosure relates to the field of computer technologies, and in particular, to a memory management technology and a computer system.

BACKGROUND

A dynamic random-access memory (DRAM) is a semiconductor memory. A main functional principle of the DRAM is to use a quantity of electric charges stored in a capacitor to indicate whether a binary bit is 1 or 0. The DRAM is usually used as a memory (or referred to as a main storage) of a computer, and is an internal memory that directly exchange data with a central processing unit (CPU). A DRAM row management policy or a DRAM row policy is a management policy for a row buffer of the DRAM. The policy is a policy of a specific condition in which closing of a row in a memory bank of the DRAM is triggered after the row is opened. Alternatively, the DRAM row management policy is a policy of a specific condition in which closing of a row buffer of a corresponding bank is triggered after data of a row enters the row buffer of the bank.

During memory access, impact of a status of a row in a memory on the memory access may include a row hit and a row conflict. The row hit indicates that a to-be-accessed row is exactly consistent with an opened row in a to-be-accessed bank. In a case of the row hit, data can be read or written by sending only one column access command (for example, a read or write command). The row conflict indicates that a row in a to-be-accessed bank has been opened, but the currently opened row is not the same as a to-be-accessed row. In this case, the currently opened row needs to be closed first, then the to-be-accessed row needs to be opened, and then column access is performed. Usually, a latency of the row hit is about ⅓ of a latency of the row conflict. Therefore, during memory access, if a memory row is closed too early, an access latency is increased. If the memory row is closed too late, a row conflict occurs and the latency is increased. Therefore, the DRAM row management policy is one of key factors that affect a latency and bandwidth for accessing the DRAM.

SUMMARY

This disclosure provides a memory management technology and a computer system, to reduce a memory access latency and improve memory access efficiency.

According to a first aspect, an embodiment of the present disclosure provides a memory management method. The memory management method may be applied to a computer system including a DRAM. The method may be implemented by a memory controller in the computer system. In the method, after obtaining a memory access, the memory controller may determine an access type of the memory access, and execute a row management policy corresponding to the access type of the memory access. The access type of the memory access includes a read access and a write access.

According to the memory management method provided in this embodiment of the present disclosure, a difference between localities of memory accesses of different types is fully considered, and the corresponding row management policy is executed based on the type of the memory access, so that memory row management can be more accurate, a memory access latency caused by an inappropriate row management policy can be reduced, and memory access efficiency can be improved.

With reference to the first aspect, in a possible implementation, the memory access is used for accessing a target row in a target memory bank in a memory. The executing a row management policy corresponding to an access type of the memory access includes: executing a row management policy that is of the target memory bank and that corresponds to the access type of the memory access. The memory includes one or more memory banks, and the target memory bank is any one of the one or more memory banks. In this case, different row management policies may be executed for different target memory banks, so that a management granularity is smaller and management is more precise.

In a possible implementation, the row management policy may be further adjusted based on the access type of the memory access and a row hit status of the target row. The row hit status includes at least one of the following states: a row hit, a row conflict, and row idle.

In a possible implementation, when the row management policy of the target memory bank is adjusted based on the access type of the memory access and the row hit status of the target row, and when the memory access is a read access, the memory controller may adjust a first indicator of the target memory bank based on the row hit status of the target row. The first indicator indicates a first row management policy of the target memory bank, and the first row management policy indicates whether to close the target row after the read access is performed.

In this way, the first indicator indicating the row management policy used after the read access is performed is specified, and the first indicator is adjusted based on only the read access and the row hit status of the target row, so that the adjustment is more accurate, the row management policy indicated by the first indicator is also more accurate, and a memory access latency can be reduced.

In another possible implementation, when the row management policy of the target memory bank is adjusted based on the access type of the memory access and the row hit status of the target row, and if the memory access is a write access, a second indicator of the target memory bank may be adjusted based on the row hit status of the target row. The second indicator indicates a second row management policy of the target memory bank, and the second row management policy indicates whether to close the target row after the write access is performed. In this case, the second indicator indicating the row management policy used after the write access is performed is specified, and the second indicator is adjusted based on only the write access and the row hit status of the target row. Therefore, after the read access and the write access are performed, different row management policies may be executed based on indications of different indicators, so that adjustment is more accurate, and a memory access latency can be reduced.

In another possible implementation, the adjusting the row management policy of the target memory bank based on the access type of the memory access and a row hit status of the target row may further include: if the memory access is a write access, determining that the row management policy of the target memory bank is a preset row management policy corresponding to the write access. The preset row management policy indicates whether to close the target row after the write access is performed. In this case, only the first indicator indicating the row management policy used after the read access is performed may be specified for the target memory bank, and the first indicator is adjusted based on only the read access of the target memory bank. Because a locality of the write access is poor, even if adjustment is performed, an effect is not noticeable. Therefore, the preset row management policy may be used, and no adjustment is performed during the memory access. For example, in actual application, considering that the locality of the write access is poor, the preset row management policy may indicate to close the target row after the write access is completely performed. In other words, in this case, only the row management policy used after the read access is performed may be adjusted, and the row management policy used after the write access is performed is not adjusted.

In another possible implementation, the row hit status includes a row hit or a row conflict. The adjusting a first indicator or a second indicator of the target memory bank based on the row hit status of the target row includes: if the memory access causes a row hit, adjusting the first indicator or the second indicator to a first indication; or if the memory access causes a row conflict, adjusting the first indicator or the second indicator to a second indication. The first indication indicates that the target row is not closed or the target row is kept in an open state, and the second indication indicates that the target row is closed.

In another possible implementation, the row hit status includes row idle. The adjusting a first indicator or a second indicator based on the row hit status of the target row includes: if the memory access causes row idle, determining whether the memory access may cause a row hit; and if the memory access may cause a row hit, adjusting the first indicator or the second indicator to the first indication, where the first indication indicates that the target row is not closed or the target row is kept in the open state, and that a row hit may be caused means that a row hit is caused if a last opened row in the target memory bank is not closed; or if the memory access may cause a row conflict, adjusting the first indicator or the second indicator to the second indication, where the second indication indicates that the target row is closed, and that a row conflict may be caused means that a row conflict is caused if a last opened row in the target memory bank is not closed.

In another possible implementation, the method further includes: determine an access type of previous memory access of the memory access. The adjusting a first indicator or a second indicator of the target memory bank based on the row hit status of the target row includes: adjusting the first indicator or the second indicator of the target memory bank based on the row hit status of the target row and the access type of the previous memory access of the memory access.

In another possible implementation, an initial value of the first indicator is greater than an initial value of the second indicator.

In another possible implementation, when the first indicator is adjusted, a first adjustment amplitude of adjustment to the first indication is greater than a second adjustment amplitude of adjustment to the second indication; and when the second indicator is adjusted, a third adjustment amplitude of adjustment to the first indication is less than a fourth adjustment amplitude of adjustment to the second indication.

In the foregoing several adjustment manners, a difference between localities of the read access and the write access is fully considered, and the first indicator or the second indicator of the target memory bank is adjusted based on the type of the memory access of the target memory bank, the type of the previous memory access of the current memory access, and the row hit status of the target row, so that adjustment of a value of the first indicator or a value of the second indicator of the target memory bank is more accurate. Therefore, the memory controller can more accurately determine, based on the indication of the first indicator or the second indicator of the target memory bank, when to close the row in the target memory bank. This reduces a memory access latency caused by an inappropriate row management policy, and improves memory access efficiency.

In another possible implementation, the memory access belongs to a first batch of memory accesses. When it is determined that the first batch of memory accesses are completely performed and a second batch of memory accesses are to be performed, the target row is closed if an access type of the first batch of memory accesses is different from an access type of the second batch of memory accesses; the target row is kept in the open state if both the first batch of memory accesses and the second batch of memory accesses are read accesses; or the target row is closed if both the first batch of memory accesses and the second batch of memory accesses are write accesses. In this manner of scheduling memory accesses in batches, memory accesses of a same type may be scheduled in a same batch, so that a read-write switching time is reduced, and memory access efficiency is improved.

In another possible implementation, the adjusting the row management policy of the target memory bank based on the indication of the first indicator or the second indicator may include: when the value of the first indicator or the value of the second indicator is greater than a preset threshold, keeping the target row in the open state after the read access is completely performed, and closing the target row until a time for keeping the open state reaches a time indicated by the value of the first indicator or a time indicated by the value of the second indicator.

In another possible implementation, the adjusting the row management policy of the target memory bank based on the indication of the first indicator or the second indicator may include: when the value of the first indicator or the value of the second indicator is greater than or equal to a first threshold, keeping the target row in the open state; or when the value of the first indicator or the value of the second indicator is less than the first threshold, closing the target row.

According to a second aspect, this disclosure provides a memory management apparatus. The apparatus includes at least one processor and the memory controller that is configured to implement the memory management method in the first aspect or any one of the implementations of the first aspect.

According to a third aspect, this disclosure provides a memory controller. The memory controller includes a communications interface and a logic circuit that is configured to perform the memory management method in the first aspect or any one of the implementations of the first aspect. The communications interface is configured to receive a memory access sent by a processor of a computer system.

According to a fourth aspect, this disclosure provides a computer system. The computer system includes a memory and the memory management apparatus in the second aspect.

According to a fifth aspect, this disclosure provides a memory management apparatus. The memory management apparatus includes functional modules configured to implement the memory management method in the first aspect or any one of the implementations of the first aspect.

According to a sixth aspect, this disclosure further provides a computer program product. The computer program product includes program code. Instructions included in the program code are executed by a computer, to implement the memory management method in the first aspect or any one of the implementations of the first aspect.

According to a seventh aspect, this disclosure further provides a computer-readable storage medium. The computer-readable storage medium is configured to store program code. Instructions included in the program code are executed by a computer, to implement the memory management method in the first aspect or any one of the implementations of the first aspect.

BRIEF DESCRIPTION OF DRAWINGS

To describe technical solutions in embodiments of the present disclosure more clearly, the following briefly describes the accompanying drawings for describing the embodiments. It is clear that the accompanying drawings in the following description show merely some embodiments of the present disclosure.

FIG. 5A-1 and FIG. 5A-2 to FIG. 5D are flowcharts of a method for adjusting a row management policy according to an embodiment of the present disclosure;

DESCRIPTION OF EMBODIMENTS

To make a person skilled in the art better understand the technical solutions in the present disclosure, the following clearly describes the technical solutions in the embodiments of the present disclosure with reference to the accompanying drawings in the embodiments of the present disclosure. It is clear that the described embodiments are merely a part but not all of the embodiments of the present disclosure.

Figure 1:
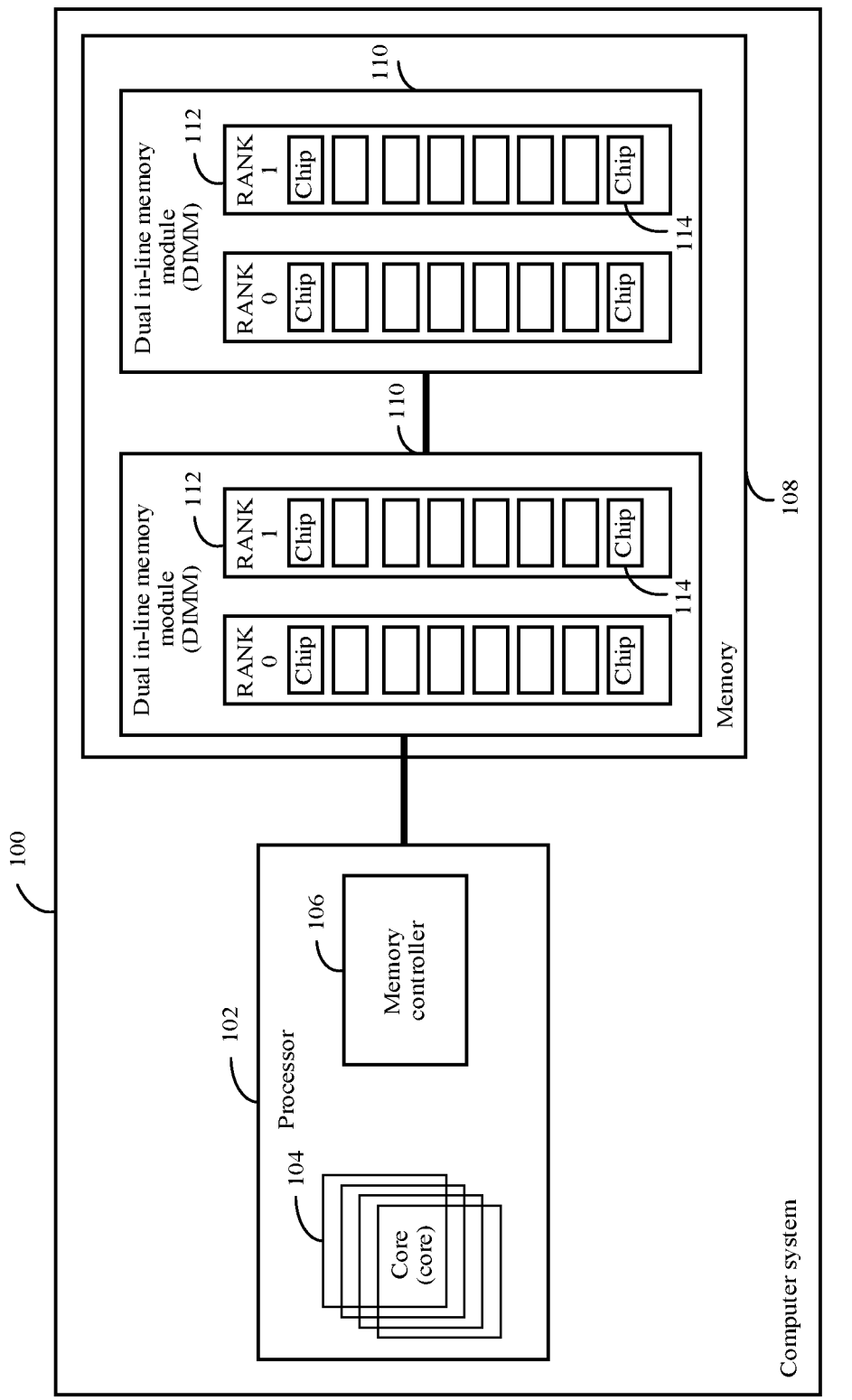
FIG. 1 is a schematic diagram of an architecture of a computer system according to an embodiment of the present disclosure.

A DRAM is a semiconductor memory. A main functional principle of the DRAM is to use a quantity of electric charges stored in a capacitor to indicate whether a binary bit is 1 or 0. The DRAM is usually used as a memory (or referred to as a main storage) of a computer system, and is an internal memory that directly exchange data with a CPU. FIG. 1 is a schematic diagram of an architecture of a computer system 100 according to an embodiment of the present disclosure. The computer system provided in this embodiment of the present disclosure may include a server, a desktop computer, and various dedicated computers. As shown in FIG. 1, the computer system 100 may include at least a processor 102, a memory controller 106, and a memory 108. Usually, the memory controller 106 may be integrated into the processor 102. It should be noted that, in addition to components shown in FIG. 1, the computer system 100 may further include a communications interface and another component such as a disk that is used as an external storage device. This is not limited herein.

The processor 102 is a computing core and a control core of the computer system 100. The processor 102 may include one or more processor cores 104. The processor 102 may be a hyperscale integrated circuit. An operating system and another software program are installed in the processor 102, so that the processor 102 can access the memory 108, a cache, and a magnetic disk. It may be understood that, in this embodiment of the present disclosure, the core 104 in the processor 102 may be, for example, a CPU, or may be another application-specific integrated circuit (ASIC). In actual application, the computer system 100 may alternatively include a plurality of processors.

The memory controller 106 is a bus circuit controller that controls the memory 108 in the computer system 100 and that is configured to manage and plan data transmission from the memory 108 to the core 104. Data may be exchanged between the memory 108 and the core 104 through the memory controller 106. The memory controller 106 may be a separate chip, and is connected to the core 104 through a system bus. A person skilled in the art may learn that the memory controller 106 may be integrated into the processor 102 (as shown in FIG. 1), may be built in a northbridge, or may be an independent memory controller chip. A specific location and an existence form of the memory controller 106 are not limited in embodiments of the present disclosure. In actual application, the memory controller 106 may control necessary logic to write data into the memory 108 or read data from the memory 108. The memory controller 106 may be a memory controller in a processor system such as a general-purpose processor, a dedicated accelerator, a graphics processing unit (GPU), a field-programmable gate array, or an embedded processor.

The memory 108 is a main storage of the computer system 100. The memory 108 is connected to the memory controller 106 through a double data rate (DDR) bus. The memory 108 is usually configured to store various types of software that are running in an operating system, input and output data, information exchanged with the external storage device, and the like. To increase an access speed of the processor 102, the memory 108 needs to have an advantage of a high access speed. In a computer system architecture, a DRAM is usually used as the memory 108. The processor 102 can access the memory 108 at a high speed by using the memory controller 106, and perform a read operation and a write operation on any memory cell in the memory 108.

In actual application, the memory 108 may include one or more dual in-line memory modules (DIMM) 110. FIG. 1 shows an example in which the memory 108 includes two DIMMs 110. Usually, one DIMM may be used as one memory module entity, and one memory module has two sides. For a high-end memory module, both sides have memory chips. Each side is called a rank. That is, one DIMM has a rank 0 and a rank 1. As shown in FIG. 1, one DIMM 110 may include one or more ranks 112. Each rank 112 may include a plurality of memory chips 114.

A person skilled in the art may learn that data is stored in the memory 108. The data is stored in a memory cell in the memory chip 114. In embodiments of the present disclosure, the memory cell refers to a minimum memory cell used for storing data. Usually, one memory cell may store 1-bit data. Certainly, some memory cells can also implement multi-valued storage. When the DRAM is used as the memory 108, memory cells in the DRAM (which may also be referred to as DRAM cells) are arranged into a matrix, and the matrix is referred to as a memory bank or a DRAM bank. In this manner, memory cells in a memory chip 114 may be logically classified into a plurality of memory banks, and each memory bank may be considered as a memory array including a plurality of memory cells. Each memory cell in the memory bank is identified by using a row address and a column address in which the memory cell is located. The memory controller can locate any memory cell in the memory bank by using a corresponding row decoder and a corresponding column decoder. In embodiments of the present disclosure, the memory bank may also be referred to as a bank for short.

Figure 2:
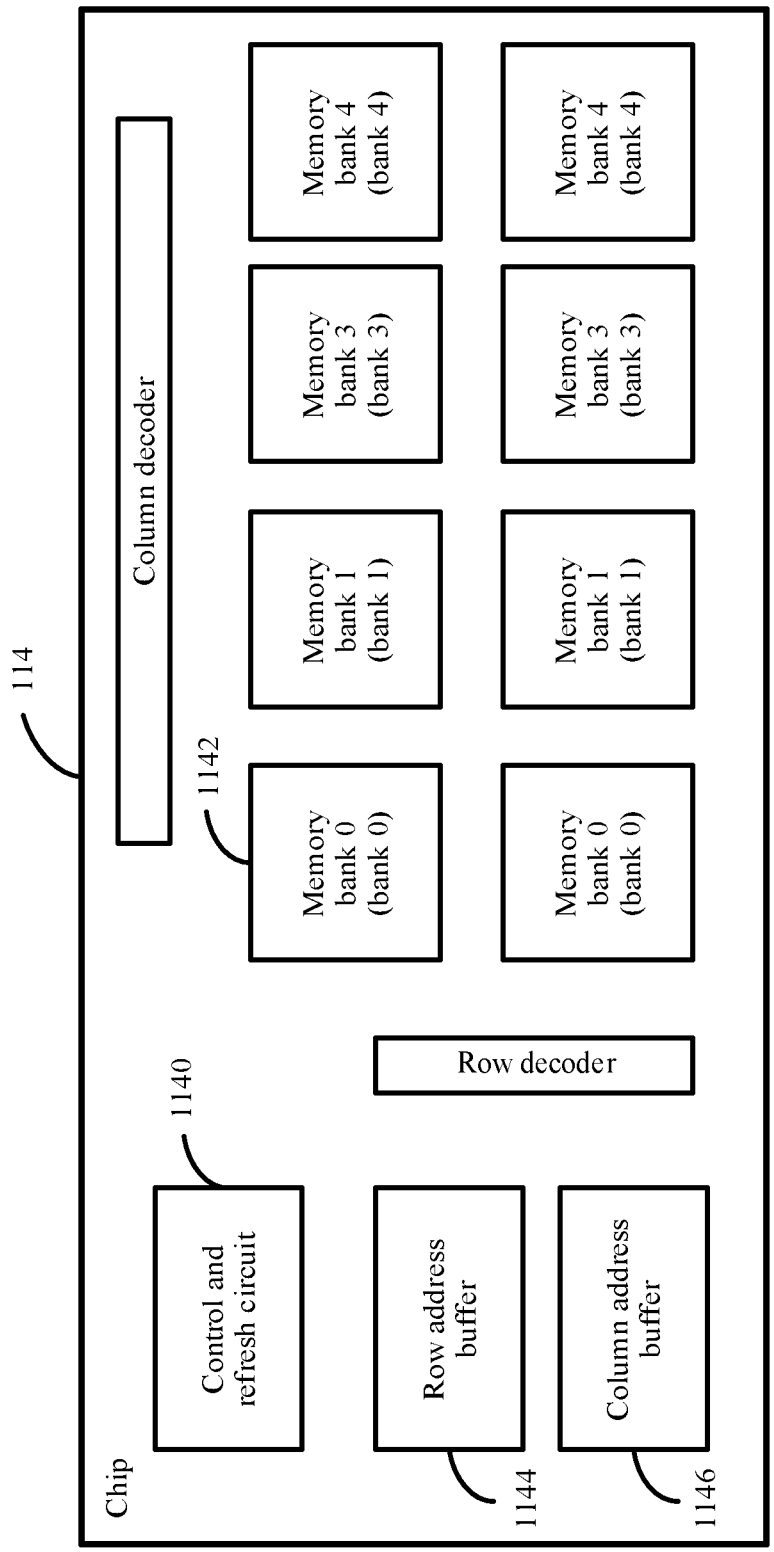
FIG. 2 is a schematic diagram of a structure of a memory chip according to an embodiment of the present disclosure.

FIG. 2 is a schematic diagram of a structure of a memory chip 114 according to an embodiment of the present disclosure. FIG. 2 shows an example in which the chip 114 includes eight banks. The memory chip 114 may include a control and refresh circuit 1140, a plurality of memory banks 1142, a row address buffer 1143, a column address buffer 1144, a row decoder 1145, and a column decoder 1146. The control and refresh circuit 1140 is configured to control a refresh operation on a memory cell. A person skilled in the art may learn that a DRAM uses a quantity of electric charges stored in a capacitor to indicate data 0 and 1, and is a volatile memory. Because a leakage phenomenon may occur in the capacitor, electric charges can be maintained only in a very short time. If the electric charges in the capacitor are insufficient, an error may occur in stored data. Therefore, to store data, the control and refresh circuit 1140 needs to automatically perform a refresh operation, to charge a memory cell in which stored data is "1", so as to prevent the DRAM 108 from losing data.

During memory access, after receiving a memory access request, the memory controller 106 generates an address signal and a control signal based on the received memory access request, and sends the generated address signal and control signal to the DIMM 110, to access the memory. The address signal may include a row address signal and a column address signal. The control signal may include a chip select (CS) signal, a write enable (WE) signal, a column address strobe (CAS), a row address strobe (RAS), and the like. These signals may be received by the control and refresh circuit 1140. The row address signal is buffered in the row address buffer 1143. The column address signal is buffered in the column address buffer 1144. The control signal is transferred to a bank corresponding to a row address specified by the address signal.

The row address buffer 1143 is configured to buffer the row address signal sent by the memory controller 106. The column address buffer 1144 is configured to buffer the column address signal sent by the memory controller 106. The row decoder 1145 is connected to the row address buffer 1143 and the plurality of banks 1142, and the column decoder 1146 is connected to the column address buffer 1144 and the plurality of banks 1142. The row decoder 1145 is configured to decode the row address signal, and the column decoder 1146 is configured to decode the column address signal, so that a corresponding memory cell in the bank 1142 can be located based on a decoded row address signal and a decoded column address signal.

When the memory controller accesses the DRAM, the memory controller 106 needs to first identify a memory row corresponding to to-be-accessed data and determine a bank to which the to-be-accessed memory row belongs, and then the memory controller 106 "opens" the bank and the memory row. In some implementations, the memory row may also be referred to as a "page", and the "page" is a logical concept. In this case, one page includes a memory cell of one memory row in the DRAM. Usually, a size of a memory page may include data of 512, 1024 (1K), 2048 (2K), 4098 (4K), 8196 (8K), 16392 (16K), or 32,768 (32K) bits.

Usually, during memory access, the to-be-accessed memory row may be in one of the following three states: a row hit, row idle, or a row conflict. The row hit indicates that the to-be-accessed memory row has been opened. To be specific, data in the to-be-accessed memory row has been loaded into a row buffer corresponding to a bank storing the data in the row, and data can be read from a memory cell of the row or written into a memory cell of the row by directly sending a column access command. The column access command may include a read command or a write command. The row idle indicates that a bank corresponding to the to-be-accessed memory row is in an idle state, no memory row is opened, and the to-be-accessed memory row needs to be opened by using an "activate" command, and then is accessed. In other words, data in the to-be-accessed memory row needs to be loaded into a row buffer corresponding to the bank by using an "activate" command, and then a column access command can be sent for access. The row conflict indicates that a currently opened memory row is different from the to-be-accessed memory row. In a case of the row conflict, the currently opened memory row needs to be "closed" first. This includes: writing data in the opened memory row back into a memory array by using a "pre-charge" command, then loading data in the to-be-accessed row into a corresponding row buffer by using an activate command, and then sending a column access command for access. In embodiments of the present disclosure, the foregoing three states of the to-be-accessed memory row may be referred to as row hit statues of the memory row. The "memory row" may also be referred to as a "row" for short, and the to-be-accessed memory row may also be referred to as a target row.

Figure 3:
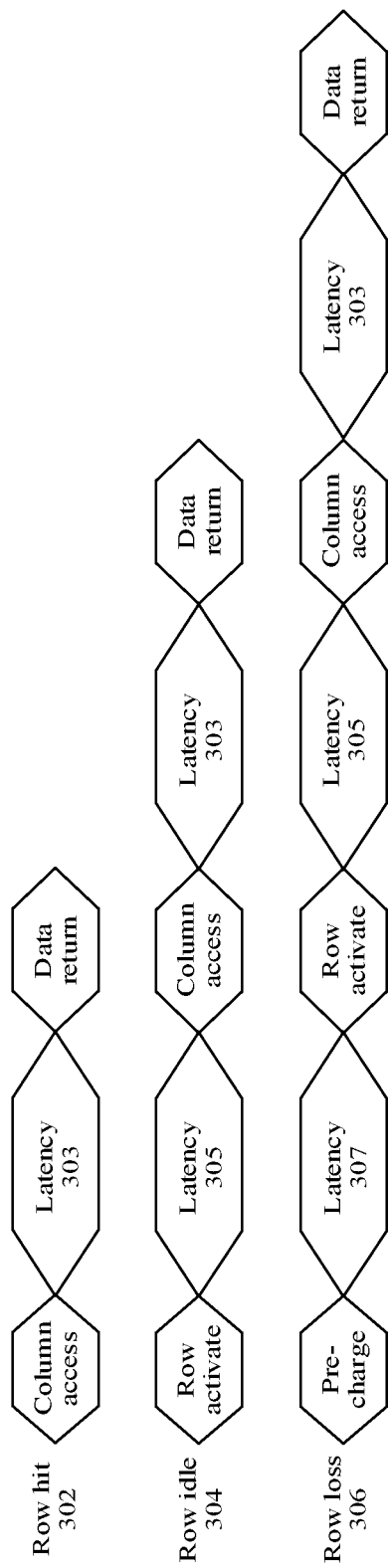
FIG. 3 is a schematic diagram of a memory access latency according to an embodiment of the present disclosure.

It can be learned from the foregoing description that, during memory access, different states of the to-be-accessed row may cause different access latencies. FIG. 3 is a schematic diagram of a memory access latency according to an embodiment of the present disclosure. As shown in FIG. 3, in a row hit state (as shown by 302 in FIG. 3), because a to-be-accessed row has been in an open state, the memory controller can directly send a column access command. After the column access command is sent, data can be read from or written into the memory. When the column access command is a read command, the read data can be obtained after a latency 303. In a case of row idle (as shown by 304 in FIG. 3), because no row in the bank is opened, a to-be-accessed row needs to be opened by using an "activate" command, and then is accessed. Therefore, the memory controller 106 needs to send a row activate command first, and then send a column access command after the latency 303 to access the opened row. When the column access command is a read command, the read data can be obtained only after a latency 305. In a case of a row conflict (as shown by 306 in FIG. 3), because a currently opened row is not a to-be-accessed row, a pre-charge command needs to be sent first to close the currently opened row, then a row activate command is sent after a latency 307 to open the to-be-accessed row, and then a column access command is sent after the latency 305 to access the to-be-accessed row. When the column access command is a read command, after the column access command is sent, the read data can be obtained only after the latency 303.

It can be learned from FIG. 3 that, a latency is the smallest in a case of a row hit. In this case, if the currently opened row is closed too early, a row idle state is caused, and the latency is increased. If the currently opened row is closed too late, a row conflict may occur and the latency is also increased. Therefore, when a row in the DRAM is opened, a policy of a specific condition in which closing of the opened row is triggered is an important factor that affects a latency and bandwidth for accessing the DRAM.

A memory row management policy may also be referred to as a DRAM row management policy (DRAM row closing policy) or a DRAM row policy, and is a policy used for managing a row buffer of the DRAM. The policy is a policy of a specific condition in which closing of a row in a bank of the DRAM is triggered after the row is opened. Alternatively, the DRAM row management policy is a policy of a specific condition in which closing of a row buffer of a corresponding bank is triggered after data of a row enters the buffer (Row Buffer) of the bank. Therefore, the DRAM row management policy affects a latency and bandwidth for accessing the DRAM.

Figure 4A:
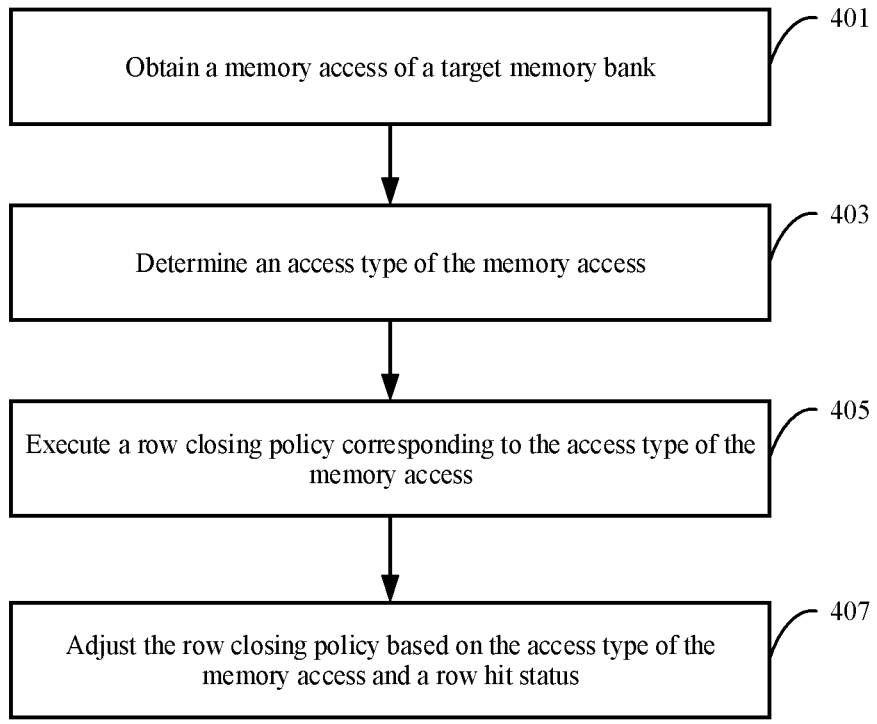
FIG. 4A is a flowchart of a memory management method according to an embodiment of the present disclosure.

Embodiments of the present disclosure provide a memory management technology, so that a row management policy of each bank in a DRAM can be dynamically adjusted, to reduce a memory access latency and improve memory access efficiency. For ease of description, in embodiments of the present disclosure, the memory row management policy may also be referred to as a row management policy. The memory management technology provided in embodiments of the present disclosure may be applied to the computer system shown in FIG. 1. In embodiments of the present disclosure, an independent policy indicator is specified for each memory bank, and a memory controller may adjust a row management policy of the memory bank based on the policy indicator specified for the bank. Considering a difference between localities of access by using a read command and access by using a write command, in embodiments of the present disclosure, a first indicator and a second indicator may be specified for a same bank. The first indicator indicates a row management policy used after a read access is performed, and the second indicator indicates a row management policy used after a write access is performed. The memory controller may determine a row management policy of the corresponding bank based on both the first indicator and the second indicator. FIG. 4A is a flowchart of a memory management method according to an embodiment of the present disclosure. The method may be performed by the memory controller in the computer system shown in FIG. 1, and the method may include the following steps.

Step 401: Obtain a memory access of a target memory bank. In this embodiment of the present disclosure, a memory 110 includes one or more memory banks, and the target memory bank may be any bank in any memory chip 114 in the memory 110. The memory access may be used for accessing a target row in the target memory bank. It may be understood that the obtained memory access may include information such as a read/write identifier, an address, and a request ID. In addition, if the memory access is a write access, the write access may further carry data to be written into the memory. The read/write identifier indicates an access type of the memory access. The address indicates a to-be-accessed address, and an identifier of a to-be-accessed bank of the memory access may be obtained based on the address. The request ID is used for identifying the memory access.

Step 403: The memory controller determines the access type of the memory access. The memory access includes a read access or a write access. In this step, the access type of the memory access may be determined based on the read/write identifier in the memory access.

Step 405: Execute a row management policy corresponding to the access type of the memory access. In this embodiment of the present disclosure, considering a difference between locality characteristics of the read access and the write access, a locality of the read access is usually better than a locality of the write access. Therefore, in this embodiment of the present disclosure, different row management policies are used for the read access and the write access. It should be noted that a good locality means that a plurality of consecutive commands are used for repeatedly accessing a same row. A poor locality means that a plurality of consecutive commands are not used for repeatedly accessing a same row. The poor locality may also be referred to as high randomness. In this step, the row management policy corresponding to the access type of the memory access may be executed. In actual application, management may alternatively be performed at a granularity of a memory bank. In this case, different row management policies may be set for different types of access of each memory bank. Therefore, in this step, a row management policy that is of the target memory bank and that corresponds to the access type of the memory access may be executed.

When the memory access is a read access, the row management policy of the target memory bank may be executed based on an indication of a specified first indicator. When the memory access is a write access, the row management policy of the target memory bank may be executed based on an indication of a specified second indicator. The first indicator indicates a row management policy used after the read access is performed, and the second indicator indicates a row management policy used after the write access is performed. In other words, the first indicator indicates whether to close the target row after the read access is performed, and the second indicator indicates whether to close the target row after the write access is performed. It should be noted that, in this embodiment of the present disclosure, the first indicator is adjusted based on only the read access, and the second indicator is adjusted based on only the write access.

When the row management policy of the target memory bank is executed based on the indication of the first indicator or the indication of the second indicator, the following several implementations may be included. In one case, the target row may be closed or kept in an open state based on the indication of the first indicator or the indication of the second indicator. For example, if a value of the first indicator or a value of the second indicator is "1", it indicates to open the target row; or if a value of the first indicator or a value of the second indicator is "0", it indicates to close the target row.

In another case, whether to close the target row may be determined based on the value of the first indicator or the value of the second indicator and a preset threshold. For example, when the value of the first indicator is greater than or equal to a first threshold, the target row is kept in the open state after the read access is completely performed; or when the value of the first indicator is less than a first threshold, the target row is closed after the read access is completely performed. When the value of the second indicator is greater than or equal to a second threshold, the target row is kept in the open state after the write access is completely performed; or when the value of the second indicator is less than a second threshold, the target row is closed after the write access is completely performed. In actual application, the first threshold and the second threshold may be the same or may be different. In actual application, alternatively, when the value of the first indicator is less than the first threshold, the target row may be kept in the open state after the read access is completely performed; or when the value of the first indicator is greater than the first threshold, the target row may be closed after the read access is completely performed. Similarly, when the value of the second indicator is less than the second threshold, the target row is kept in the open state after the write access is completely performed; or when the value of the second indicator is greater than the second threshold, the target row is closed after the write access is completely performed.

In still another case, the row management policy of the target row may alternatively be executed based on a time indicated by the value of the first indicator or the value of the second indicator. For example, if the memory access is a read access and the value of the first indicator is greater than or equal to a third threshold, the target row is kept in the open state after the read access is completely performed, and the target row is closed until a time for keeping the open state reaches a time indicated by the value of the first indicator. If the memory access is a write access and the value of the second indicator is greater than or equal to a fourth threshold, the target row may be kept in the open state after the write access is completely performed, and the target row is closed until a time for keeping the open state reaches a time indicated by the value of the second indicator. The third threshold and the fourth threshold may be the same or may be different, and both the third threshold and the fourth threshold may be integers greater than or equal to 0.

In yet another case, the method may further include step 407: The memory controller may adjust the corresponding row management policy based on the access type of the memory access and a row hit status of the target row. The row hit status of the target row may include a row hit, a row conflict, or row idle. The memory controller may determine the row hit status of the target row based on the address of the memory access. When the address of the memory access is consistent with an address of an opened row in the target bank, it is considered that the memory access causes a row hit. When it is determined, based on the address of the memory access, that there is no opened row in the target bank, it is considered that the memory access causes row idle. When the address of the memory access is inconsistent with an address of an opened row in the target bank, it is considered that the memory access causes a row conflict.

In actual application, the row management policy of the target bank may be adjusted by adjusting a policy indicator corresponding to the row management policy. In this embodiment of the present disclosure, considering a difference between localities of the read access and the write access, corresponding policy indicators may be adjusted based on different access types, to adjust a corresponding row management policy. For example, in one case, the policy indicator that may be specified for the target bank may include the first indicator and the second indicator. The first indicator indicates whether to close the target row after the read access is performed, and the second indicator indicates whether to close the target row after the write access is performed. In other words, the first indicator indicates a row management policy corresponding to the read access, and the second indicator indicates a row management policy corresponding to the write access. When it is determined that the memory access is a read access in step 403, the first indicator of the target memory bank may be adjusted based on the row hit status of the target row in this step. When it is determined that the memory access is a write access in step 403, the second indicator of the target memory bank may be adjusted based on the row hit status of the target row in this step. During specific adjustment, for example, if the memory access causes a row hit, the first indicator or the second indicator is adjusted to a first indication, where the first indication indicates that the target row is not closed or the target row is kept in the open state. If the memory access causes a row conflict, the first indicator or the second indicator is adjusted to a second indication, where the second indication indicates that the target row is closed. For a specific adjustment method, refer to the following descriptions in FIG. 5A-1 and FIG. 5A-2 to FIG. 5D. Details are not described herein. In another case, in this step, the first indicator of the target bank may alternatively be adjusted based on only the read access, and the row management policy corresponding to the write access is not adjusted.

It should be noted that, in actual application, a sequence of performing step 405 and step 407 is not limited. The row management policy of the target bank may be adjusted based on the hit status of the target row first, and then an adjusted row management policy corresponding to the type of the memory access is executed. Alternatively, the row management policy corresponding to the type of the memory access may be executed first, and then the row management policy is adjusted based on the row hit status of the target row to be accessed during the memory access.

In this embodiment of the present disclosure, when the row management policy of the memory row in the DRAM is executed, a difference between localities of different access types is fully considered, and the corresponding row management policy is executed based on the access type, so that memory row management can be more accurate, a memory access latency caused by an inappropriate row management policy can be reduced, and memory access efficiency can be improved.

Figure 4B:
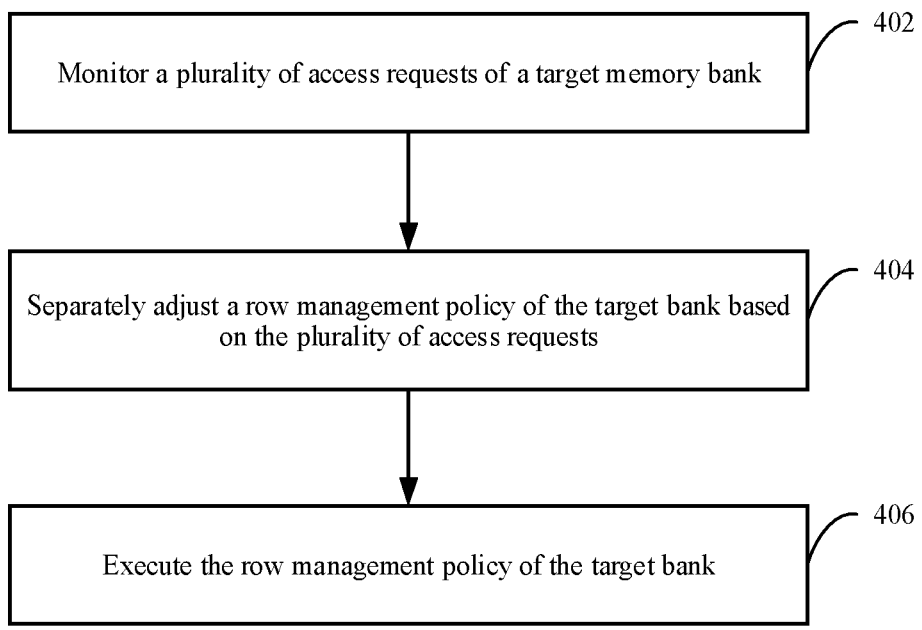
FIG. 4B is a flowchart of another memory management method according to an embodiment of the present disclosure.

As shown in FIG. 4A, the embodiment of the present disclosure provides a description from a perspective of one memory access. As shown in FIG. 4B, the following provides a description from a perspective of a plurality of memory accesses. FIG. 4B is a flowchart of another memory management method according to an embodiment of the present disclosure. The method may still be performed by the memory controller in the computer system shown in FIG. 1, and the method may include the following steps.

Step 402: Monitor a plurality of memory accesses of a target memory bank. The plurality of memory accesses may include read accesses or write accesses. In this embodiment of the present disclosure, the monitoring a plurality of memory accesses of a target bank includes: obtaining the plurality of memory accesses of the target bank, and determining an access type and a row hit status of each memory access of the target bank, where the row hit status includes whether a row hit, row idle, or a row conflict is caused. The access type of the memory access may be determined based on a read/write identifier in the memory access. A status of a to-be-accessed row may be determined based on an address of each memory access. When an address of a memory access is consistent with an address of an opened row in the target bank, it is considered that the memory access causes a row hit. When it is determined, based on an address of a memory access, that there is no opened row in the target bank, it is considered that the memory access causes row idle. When an address of a memory access is inconsistent with an address of an opened row in the target bank, it is considered that the memory access causes a row conflict.

Step 404: Separately adjust a row management policy of the target bank based on the plurality of memory accesses. For example, a first indicator may be adjusted based on the read access in the plurality of memory accesses, and a second indicator may be adjusted based on the write access in the plurality of memory accesses. The first indicator indicates a row management policy used after the read access is performed, and the second indicator indicates a row management policy used after the write access is performed. In this embodiment of the present disclosure, considering a difference between locality characteristics of the read access and the write access, a second indicator and a first indicator of a same bank are separately specified. For ease of description, a bank in a memory chip 114 is used as an example for description in this embodiment of the present disclosure.

In this embodiment of the present disclosure, the second indicator and the first indicator each may exist in a form of a counter or a register. The following describes the second indicator by using a counter as an example. During initialization, different initial values may be assigned to the first indicator and the second indicator. Considering that a locality of the read access is better than a locality of the write access, an initial value of the first indicator may be greater than an initial value of the second indicator.

After the initialization is completed, the value of the first indicator may be adjusted based on the read access to the bank, and the value of the second indicator may be adjusted based on the write access to the bank. It should be noted that, in this embodiment of the present disclosure, for any bank, a first indicator of the bank is adjusted based on only a read access to the bank, and a second indicator of the bank is adjusted based on only a write access to the bank. For details about how to adjust the value of the first indicator or the value of the second indicator of the target bank based on the memory access of the target bank, refer to embodiments shown in FIG. 5A-1 and FIG. 5A-2 to FIG. 5D.

Step 406: Execute the row management policy of the target bank. For details about how to execute the row management policy of the target bank based on an indication of the first indicator or an indication of the second indicator, refer to the description of step 405 in FIG. 4A. For example, the row in the target bank may be closed based on a time indicated by the first indicator or a time indicated by the second indicator. Alternatively, the row in the target bank may be closed based on the indication of the first indicator or the indication of the second indicator, or the row in the target bank may be closed based on a preset threshold and the value of the first indicator or the value of the second indicator. For details about how to dynamically adjust the row management policy of the target bank based on the value of the second indicator or the value of the first indicator, refer to a description in FIG. 6.

Figures 1, 5A:
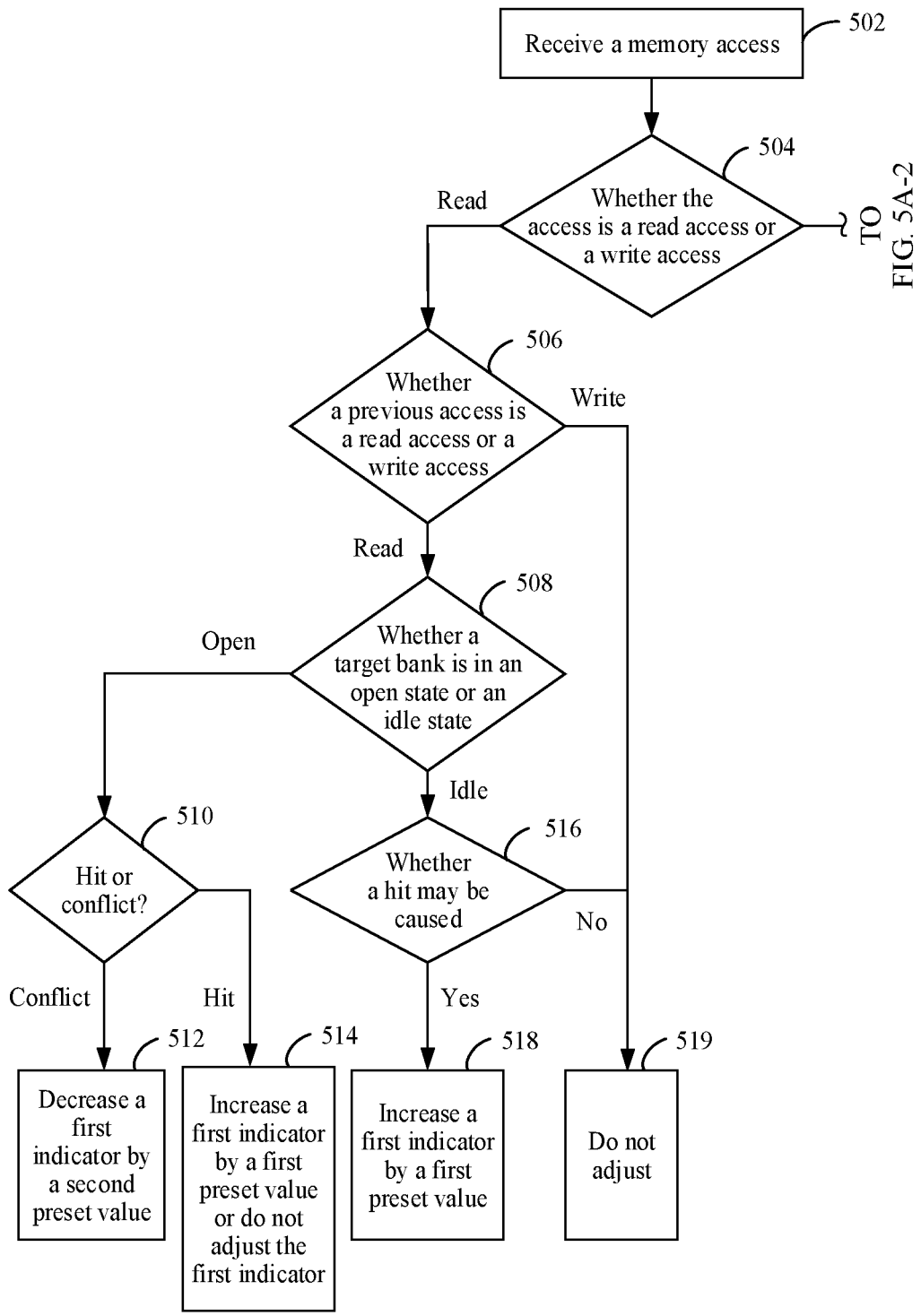
Figures 2, 5A:
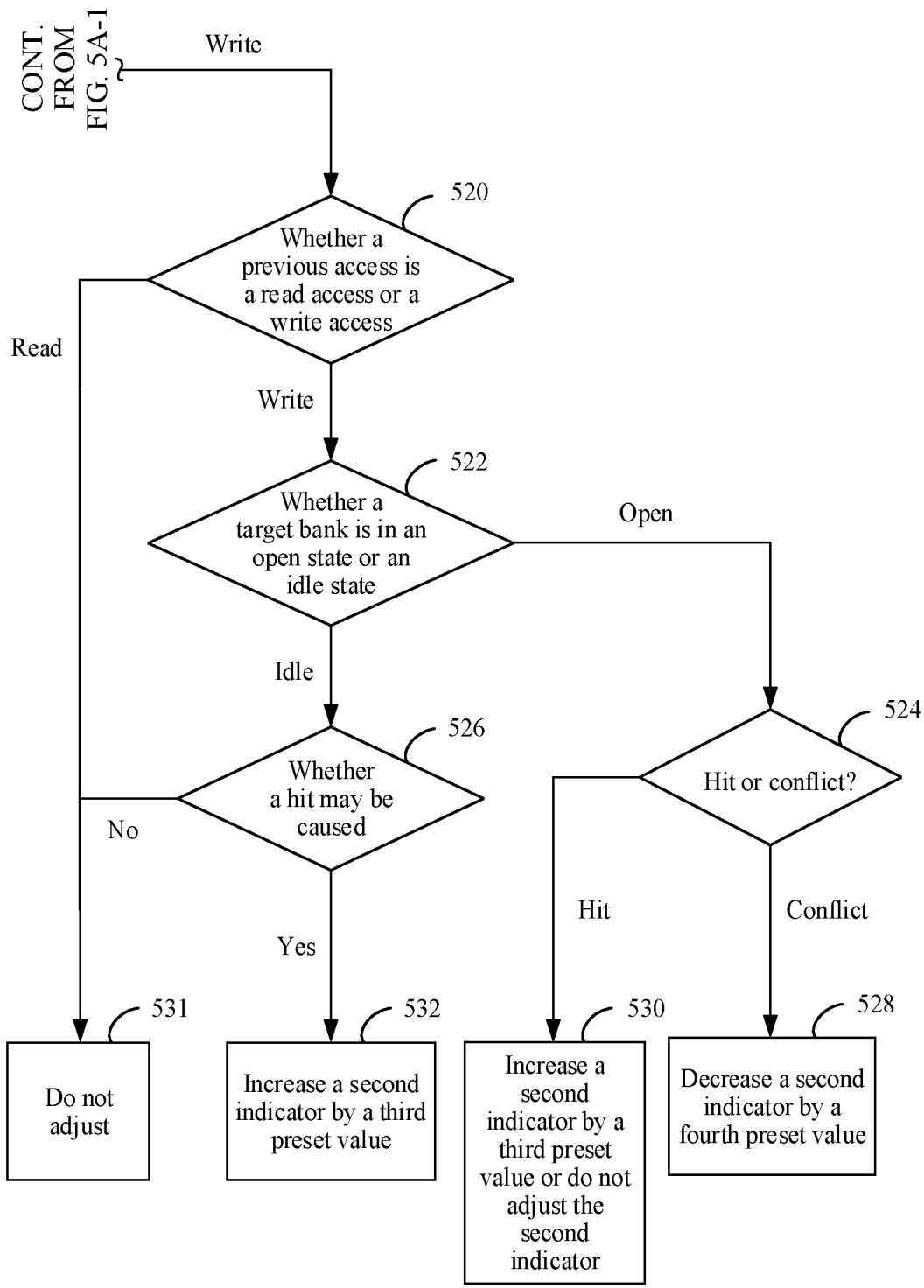

FIG. 5A-1 and FIG. 5A-2 are a flowchart of a method for adjusting a row management policy according to an embodiment of the present disclosure. It may be understood that the row management policy may be adjusted by adjusting a corresponding policy counter. In FIG. 5A-1 and FIG. 5A-2, an example in which one target bank corresponds to two policy indicators (including a first indicator and a second indicator) is used. In FIG. 5A-1 and FIG. 5A-2, one memory access is used as an example for description. It may be understood that, for any memory access obtained by the memory controller in FIG. 4A and FIG. 4B, a corresponding row management policy may be adjusted according to the method shown in FIG. 5A-1 and FIG. 5A-2. The method may include the following steps.

Step 502: A memory controller receives a memory access. As described above, the received memory access may include information such as a read/write identifier, an address, and a request ID. Step 504: The memory controller determines whether the memory access is a read access or a write access. If the memory access is a read access, the method proceeds to step 506. If the memory access is a write access, the method proceeds to step 520. It may be understood that step 502 and step 504 are similar to step 401 and step 403 in FIG. 4A and step 402 in FIG. 4B. In this embodiment, the description is provided again for clarity. In actual application, step 502 and step 504 do not need to be performed after step 401 and step 403 in FIG. 4A are performed or step 402 in FIG. 4B is performed.

When the memory access is a read access, in step 506, it is further determined whether a previous memory access of the target memory bank (memory bank or bank for short) is a read access or a write access. If the previous memory access is a read access, the method proceeds to step 508. If the previous memory access of the memory access is a write access, to reduce inappropriate closing of a row in the target bank due to read-write switching caused by a random operation, the method proceeds to step 519. Step 508: The memory controller determines whether the target bank is in an open state or an idle state. If the target bank is in the open state, the method proceeds to step 510. If the target bank is in the idle state, the method proceeds to step 516.

When the target bank is opened, in step 510, the memory controller determines whether the memory access causes a row hit. The memory controller may determine, based on a row address of the memory access, whether an opened row in the target bank is hit. If the row address of the memory access is the same as an address of the opened row in the target bank, it is considered that the memory access causes a row hit. Otherwise, it is considered that the memory access causes a row conflict. If the memory access causes a row hit, it indicates that a decision to keep the row in the open state is correct, and the method proceeds to step 514. Step 514: The memory controller may adjust the first indicator to a first indication, where the first indication indicates that a target row is not closed or a target row is kept in the open state. For example, the memory controller may increase a value of the first indicator by a first preset value or not adjust the first indicator of the target bank, to keep the target row in the open state. The first preset value may be 1 or another value.

If the memory access causes a row conflict, it indicates that the currently opened row in the target bank should be closed as early as possible, and the method proceeds to step 512. Step 512: The memory controller adjusts the first indicator of the target bank to a second indication, where the second indication indicates that the target row is closed. For example, in step 512, the memory controller may decrease a value of the first indicator of the target bank by a second preset value. For example, the second preset value may be 1 or another value. The first preset value may also be referred to as a first adjustment amplitude, and the second preset value may also be referred to as a second adjustment amplitude.

If the target bank is idle, in step 516, the memory controller further determines whether the memory access may cause a row hit. That a row hit may be caused means that a row hit is caused if a last opened row in the target bank is not closed. As described above, when the target bank is idle, it indicates that no row in the target bank is in the open state. The idle state of the target bank may be caused because the row in the target bank is closed after the previous memory access of the target bank is completely performed. In this step, the memory controller may compare the row address of the memory access with a row address of the previous memory access, to determine whether the memory access may cause a row hit.

If the row address of the memory access is the same as the row address of the previous memory access, it is determined that the memory access may cause a row hit. In this case, it indicates that the last opened row in the target bank should be opened for a longer period of time, but is closed in advance. Therefore, the method proceeds to step 518. Step 518: The memory controller adjusts the first indicator of the target bank to the first indication, for example, increases the value of the first indicator by the first preset value. For example, the first preset value may be 1 or another value. If it is determined that the memory access may not cause a row hit, that is, the memory access may cause a row conflict, it indicates that a policy of closing the last opened row in the target bank is correct, and the method proceeds to step 519. Step 519: The memory controller does not adjust the first indicator of the target bank. The last opened row in the target bank may also be referred to as a row accessed by using the previous memory access of the memory access.

The method goes back to step 504. If it is determined in step 504 that the memory access is a write access, in step 520, the memory controller further determines whether the previous memory access of the memory access is a read access or a write access. If the previous memory access of the memory access is a read access, the method proceeds to step 531: The memory controller does not adjust a write counter of the target bank. If the previous memory access of the memory access is a write access, the method proceeds to step 522. Step 522: The memory controller determines whether the target bank is in an open state or an idle state. If the target bank is in the open state, the method proceeds to step 524. If the target bank is in the idle state, the method proceeds to step 526. It should be noted that, in embodiments of the present disclosure, that the target bank is in the open state means that a row in the target bank is opened.

When the target bank is in the open state, in step 524, the memory controller further determines whether the memory access causes a row hit. The memory controller may determine, based on the row address of the memory access, whether a row hit is caused. If the memory access causes a row hit, it indicates that a policy of keeping the current row in the target bank in the open state is correct, and the method proceeds to step 530. Step 530: The memory controller may adjust the second indicator to a first indication, where the first indication indicates that the target row is not closed or the target row is kept in the open state. For example, as shown in FIG. 5A-1 and FIG. 5A-2, in step 530, the memory controller may increase a value of the second indicator of the target bank by a third preset value, or may not adjust the second indicator. If the memory access causes a row conflict, in other words, the memory access does not hit the opened row in the target bank, it indicates that the currently opened row in the target bank should be closed as early as possible, and the method proceeds to step 528. Step 528: The memory controller may adjust the second indicator to a second indication, where the second indication indicates that the target row is closed. For example, the memory controller may decrease a value of the second indicator of the target bank by a fourth preset value. The third preset value or the fourth preset value may be 1 or another value. The third preset value may also be referred to as a third adjustment amplitude, and the fourth preset value may be referred to as a fourth adjustment amplitude.

When the target bank is idle, in step 526, the memory controller further determines whether the memory access may cause a row hit. As described above, that a row hit may be caused means that a row hit is caused if a last opened row in the target bank is not closed. In this step, the memory controller may compare the row address of the memory access with a row address of the last opened row, to determine whether the memory access may cause a row hit. If the row address of the memory access is the same as the row address of the last opened row, it is determined that a row hit may be caused. Otherwise, it is considered that a row conflict may be caused. If it is determined that the memory access may cause a row hit, it indicates that the last opened row in the target bank is closed in advance, and should be opened for a longer period of time. It may be understood that the last opened row in the target bank is a row accessed by using the previous memory access of the memory access. In this case, the method proceeds to step 532. Step 532: The memory controller adjusts the second indicator corresponding to the target bank to the first indication. For example, the memory controller may increase the value of the second indicator of the target bank by the fourth preset value. The fourth preset value may be 1 or another value. If it is determined that the memory access may cause a row conflict, it indicates that a policy of closing of the last opened row in the target bank is correct, and the method proceeds to step 531. Step 531: The memory controller does not adjust the second indicator of the target bank.

It should be noted that the first preset value, the second preset value, the third preset value, and the fourth preset value in this embodiment of the present disclosure may be the same or may be different. This is not limited herein. When the first preset value, the second preset value, the third preset value, and the fourth preset value are different, considering a difference between localities of the read access and the write access, continuity of the read access is better, to further reduce a latency, a row accessed by using the read access may be kept open for a longer time. Randomness of the write access is higher, to reduce a latency, a row accessed by using the write access needs to be kept open for a shorter time, so as to avoid more row conflicts. Therefore, in this embodiment of the present disclosure, the first preset value may be greater than the second preset value, and the third preset value may be less than the fourth preset value. In other words, when the first indicator is adjusted, the first adjustment amplitude of adjustment to the first indication may be greater than the second adjustment amplitude of adjustment to the second indication. When the second indicator is adjusted, the third adjustment amplitude of adjustment to the first indication may be less than the fourth adjustment amplitude of adjustment to the second indication.

In the embodiment shown in FIG. 5A-1 and FIG. 5A-2, a difference between localities of the read access and the write access is fully considered, a row management policy of the target bank is separately adjusted based on types of a plurality of memory accesses of the target bank, a type of a previous memory access of a current memory access, and a current status of the target bank. For example, the first indicator may be adjusted based on the read access to adjust a row management policy corresponding to the read access, and the second indicator may be adjusted based on the write access to adjust a row management policy corresponding to the write access, so that adjustment of the first indicator of the target bank and adjustment of the second indicator of the target bank are more accurate. Therefore, the memory controller can determine, based on an indication of the first indicator of the target bank and an indication of the second indicator of the target bank, when to close the row in the target bank. This reduces a memory access latency caused by an inappropriate row management policy, and improves memory access efficiency.

Figure 5B:
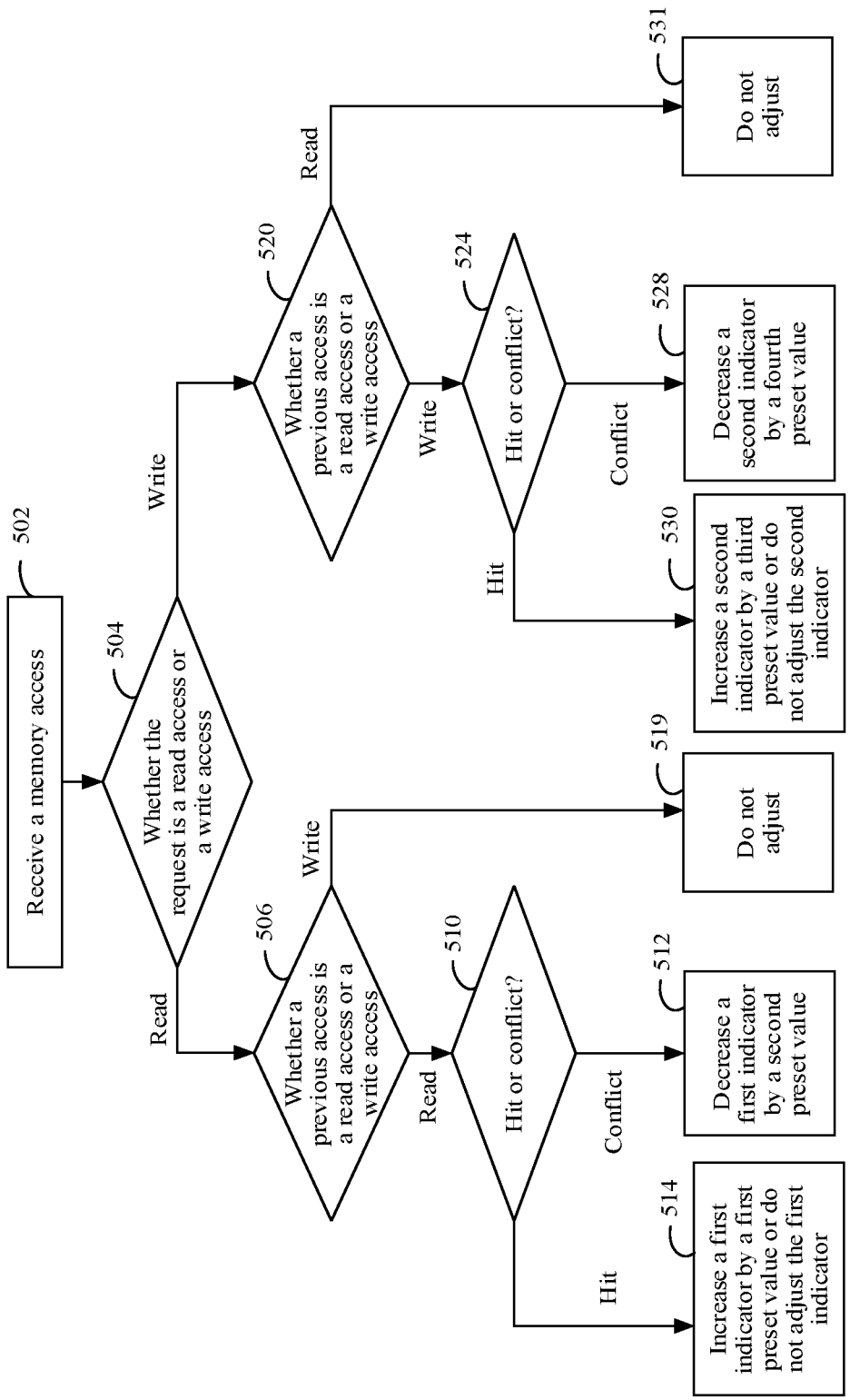

It may be understood that, in another case, when the row management policy is adjusted based on an access type of the memory access and a row hit status, because no row is opened in a row idle state, it may be considered that impact of the row idle state on the access latency is small. Therefore, in this implementation, the impact of the row idle state on the access latency may not be considered, and the row management policy is adjusted based on only two cases: the row hit and the row conflict. In this way, the adjustment method is simpler. In other words, in this case, it may be considered that the row hit status of the memory access includes only two types: the row hit and the row conflict, and a row idle case is not considered. As shown in FIG. 5B, in comparison with the adjustment method shown in FIG. 5A-1 and FIG. 5A-2, steps 508, 516, 518, 522, 526, and 532 are not performed in a method for adjusting a row management policy shown in FIG. 5B. In the method for adjusting a row management policy shown in FIG. 5B, different memory access types are still considered, a first indicator and a second indicator are separately specified for a target bank, and a value of the first indicator or a value of the second indicator is adjusted based on different types of memory accesses. In this way, a difference between a read access and a write access is considered during adjustment. This reduces a memory access latency.

Figures 1, 5C:
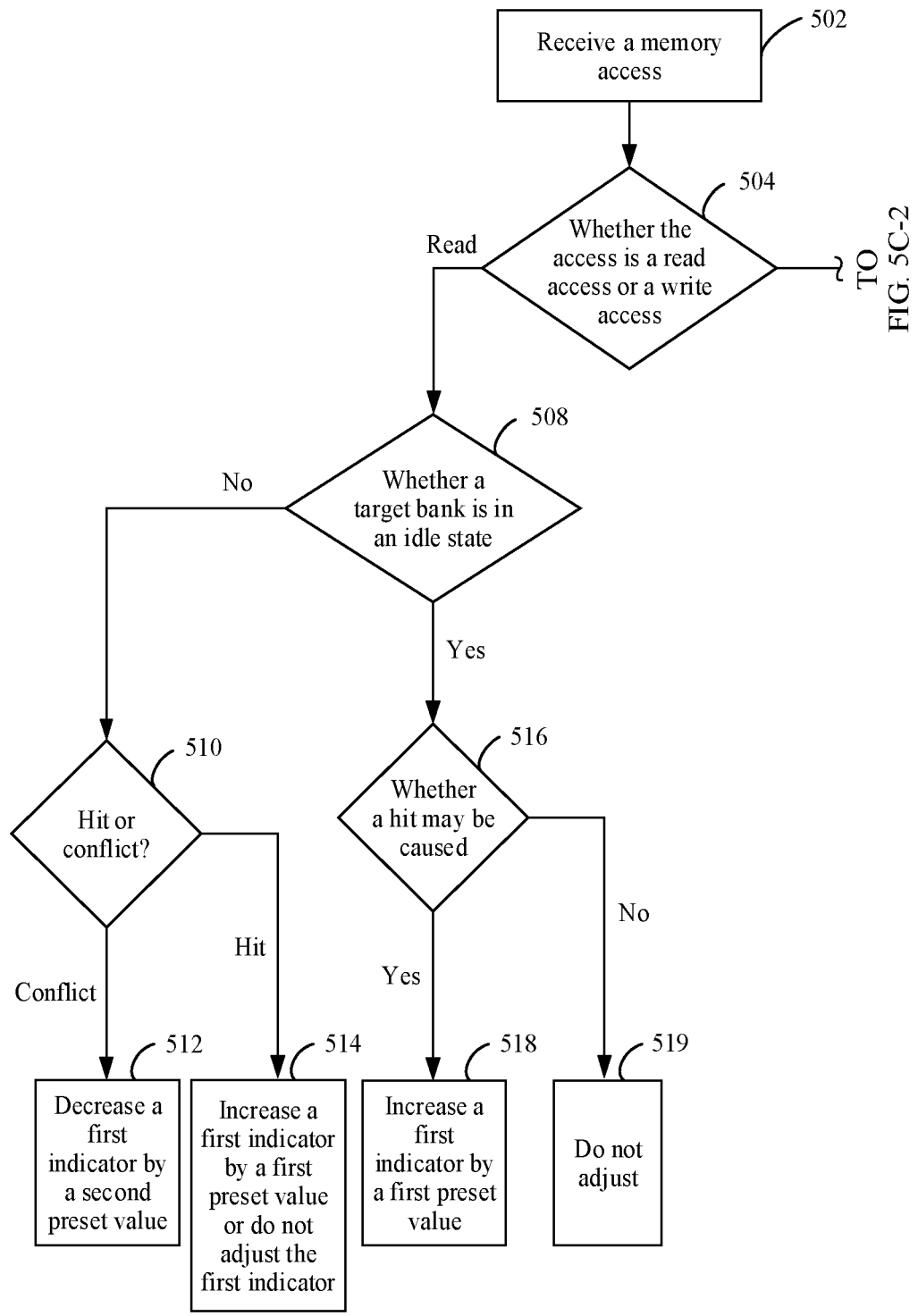
Figures 2, 5C:
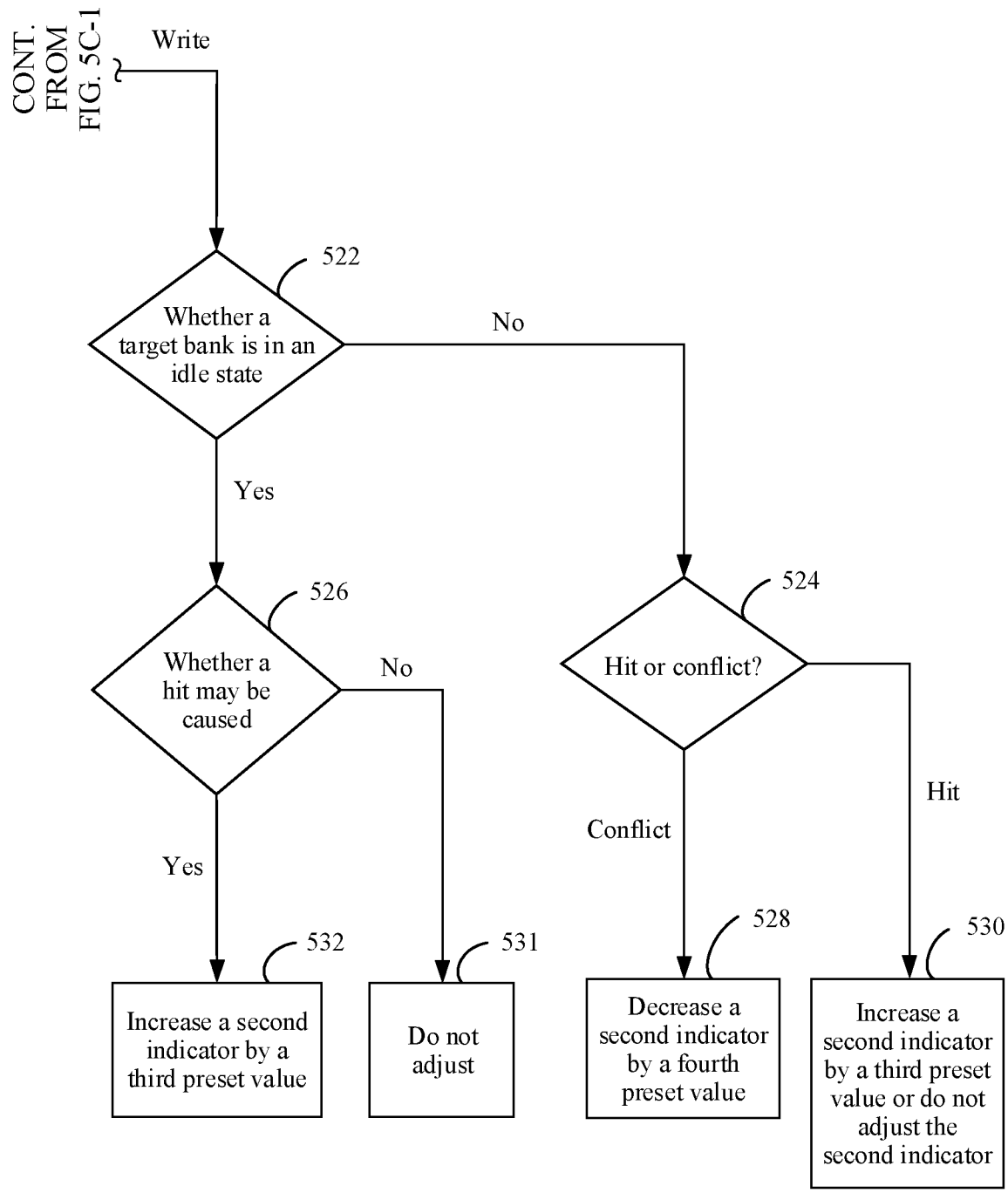

In another case, when a policy counter is adjusted, a type of a previous memory access request may alternatively not be considered. In the adjustment method shown in FIG. 5A-1 and FIG. 5A-2, after step 504 is performed, step 506 or step 520 may not be performed, and the method may directly proceed to step 508 or step 522. In other words, in the adjustment method shown in FIG. 5A-1 and FIG. 5A-2, step 506 and step 520 are optional steps, and may not be performed in actual application. For descriptions of other steps, refer to the description of the embodiment shown in FIG. 5A-1 and FIG. 5A-2. This adjustment method may be shown in FIG. 5C-1 and FIG. 5C-2. In this adjustment manner shown in FIG. 5C-1 and FIG. 5C-2, different policy indicators are separately adjusted based on a read access and a write access. In this way, a difference between localities of the read access and the write access is fully considered, adjustment is more accurate, and a memory access latency can also be reduced. In addition, because the type of the previous memory access request is not considered, the adjustment manner is simpler than that in the embodiment shown in FIG. 5A-1 and FIG. 5A-2. However, read-write switching caused by a random operation may cause inappropriate closing of a row in the target bank.

Figure 5D:
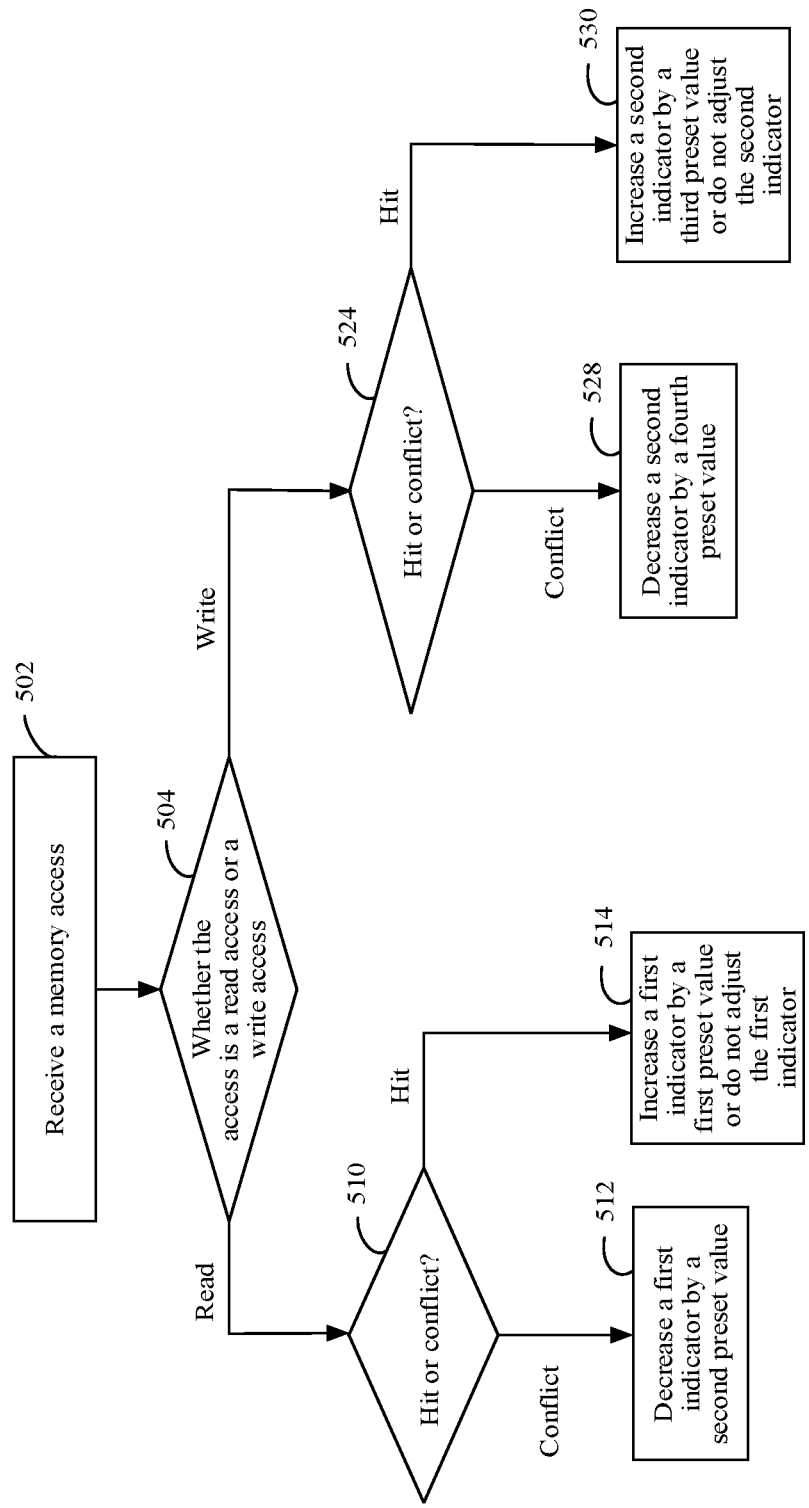

In another adjustment method, neither a type of a previous memory access request nor whether a target bank is idle may be considered, but a first indicator or a second indicator is adjusted based on only a type of a received memory access and a hit status (including a row hit and a row conflict) of the memory access. For example, in the adjustment method shown in FIG. 5A-1 and FIG. 5A-2, only steps 502, 504, 510, 512, 514, 524, 528, and 530 may be performed. In this manner, a difference between localities of a read access and a write access is considered. Therefore, the adjustment method is simpler. Details are shown in FIG. 5D.

It can be learned based on the foregoing description that, in actual application, steps 506, 508, and 516 in FIG. 5A-1 and FIG. 5A-2 are not necessarily performed. Based on a specific requirement, the steps may be performed or not performed, or a part of the steps may be performed. Another row management policy adjustment manner is not limited in embodiments of the present disclosure, provided that different row management policies are separately adjusted based on different types of memory accesses and a hit status of a target row when the row management policies are adjusted. In actual application, in one case, the hit status of the target row may include three types: a row hit, a row conflict, and row idle. In another case, the hit status of the target row may alternatively include only two types: a row hit and a row conflict.

Figure 6:
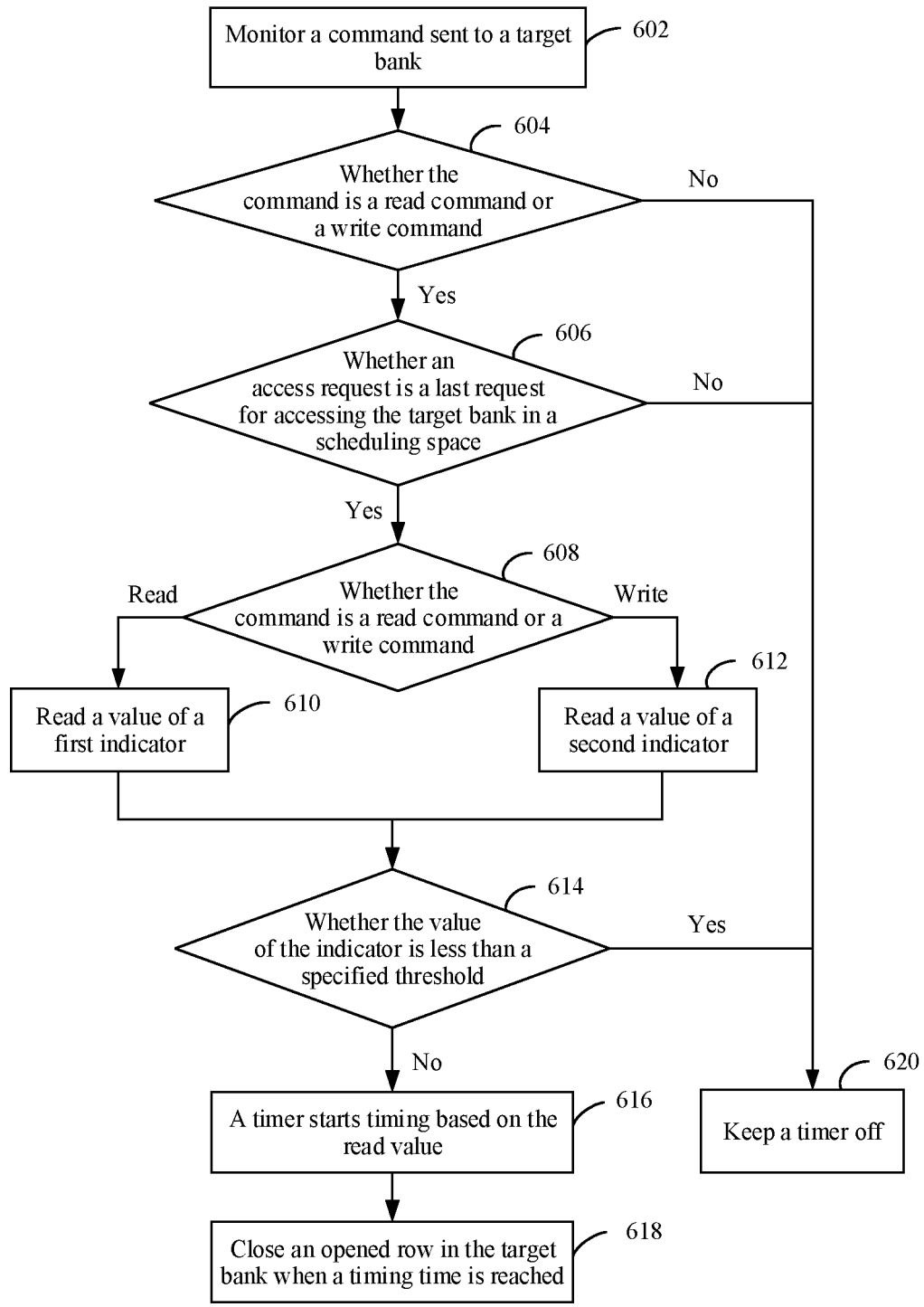
FIG. 6 is a flowchart of a method for executing a memory row management policy according to an embodiment of the present disclosure.

With reference to FIG. 6, the following describes in detail how the memory controller executes the memory row management policy based on the value of the second indicator or the value of the first indicator in step 405 or step 406. FIG. 6 is a flowchart of a method for executing a memory row management policy according to an embodiment of the present disclosure. In this embodiment of the present disclosure, a memory controller may set a timer for each bank, so that the memory controller can determine, based on a value of a first indicator or a value of a second indicator of the bank, when to close an opened row in the bank, to execute a row management policy corresponding to the bank. For ease of description, in FIG. 6, one bank is still used as an example for description. The method may include the following steps.

Step 602: The memory controller monitors a memory access command sent to a target bank. After the memory controller receives a memory access request, the memory controller accesses a target bank 1142 in a memory 114 based on an address of the memory access request. The memory controller may send the memory access command to the target bank based on a status of a row in the target bank. For example, when the target bank is in a row idle state, the memory controller sends an activate command, to activate a row to be accessed by using the memory access. In a case of a row hit, the memory controller may directly send a read command or a write command based on the received memory access. In a case of a row conflict, the memory controller sends a pre-charge command to the target bank to close an opened row in the target bank, then sends an activate command to open a to-be-accessed row, and finally sends a read command or a write command for access. It can be learned that the commands sent by the memory controller to the target bank may include at least several types: the activate command, the pre-charge command, the read command, or the write command.

Step 604: The memory controller determines whether the memory access command is a read command or a write command. As described above, the commands sent by the memory controller to the target bank may include at least several types: the activate command, the pre-charge command, the read command, or the write command. Therefore, in step 604, if the memory controller determines that the command is a read command or a write command, the method proceeds to step 606. If the command is not a read command or a write command, the method proceeds to step 620.

Step 606: The memory controller determines whether a memory access request to which the memory access command belongs is a last memory access request for accessing the target bank in a scheduling queue. As described above, the read command or the write command sent by the memory controller to the target bank is obtained based on the currently processed memory access request. In actual application, the memory controller places a plurality of received memory access requests in a buffer queue, schedules a memory access request in the buffer queue to the scheduling queue according to a specific scheduling policy, and then separately processes the memory access request in the scheduling queue. Usually, space of the buffer queue is larger than space of the scheduling queue, and there are more memory access requests buffered in the buffer queue than memory access requests in the scheduling queue.

In this step, the memory controller may determine, based on addresses of a plurality of memory access requests in the scheduling queue, whether the memory access request (that is, the currently processed access request) to which the memory access command belongs is the last memory access request for accessing the target bank in the scheduling queue. In other words, the memory controller may determine, based on an address of each memory access request, whether there is another memory access request for accessing the target bank in the scheduling queue. If the memory access request to which the command belongs (that is, the currently processed access request) is the last memory access request for accessing the target bank in the scheduling queue, in other words, there is no other memory access request for accessing the target bank in the scheduling queue, the method proceeds to step 608. If the memory access request to which the command belongs (that is, the currently processed memory access request) is not the last memory access request for accessing the target bank in the scheduling queue, in other words, there is another memory access request for accessing the target bank in the scheduling queue, the method proceeds to step 620.

Step 608: The memory controller further determines whether the memory access command is a read command or a write command. If the command is a read command, the method proceeds to step 610. If the memory access command is a write command, the method proceeds to step 612. Step 610: The memory controller reads the value of the first indicator of the target bank, and the method proceeds to step 614. Step 612: The memory controller reads the value of the second indicator of the target bank, and then the method proceeds to step 614. It may be understood that the value of the first indicator and the value of the second indicator of the target bank may be values obtained after adjustment based on the methods shown in FIG. 5A-1 and FIG. 5A-2 to FIG. 5D, or may be values before adjustment. In other words, in actual application, after the memory access is completely executed, a row management policy corresponding to the target bank may be executed first, and then the first indicator or the second indicator indicating the row management policy of the target bank is adjusted based on the executed memory access. Alternatively, after the first indicator or the second indicator indicating the row management policy of the target bank is adjusted based on the memory access, a row management policy indicated by the adjusted first indicator or second indicator may be selected and executed. This is not limited herein.

Step 614: The memory controller determines whether the value of the indicator read in step 610 or step 612 is less than a specified threshold. If the read value of the first indicator or the read value of the second indicator is not less than the threshold, the method proceeds to step 616. If the read value of the first indicator or the read value of the second indicator is less than the threshold, the method proceeds to step 620. In actual application, the threshold may be set to 0 or another value. This is not limited herein.

Step 616: The memory controller controls a timer corresponding to the target bank to start timing based on the read value of the first indicator or the read value of the second indicator, and then the method proceeds to step 618. Step 618: The memory controller closes the opened row in the target bank when the timer reaches a timing time. The memory controller may send a pre-charge command to the target bank, to close the opened row in the target bank. It may be understood that, the timer may start timing based on the value of the first indicator or the value of the second indicator in an incremental or decremental manner. For example, the timer may start timing from 0 until the time of the timer increases to the value of the first indicator or the value of the second indicator; or the timer may start timing in a decremental manner after the time of the timer is set to the value of the first indicator or the value of the second indicator. A timing manner is not limited herein.

The method for executing a row management policy shown in FIG. 6 is to execute the row management policy of the target row based on the time indicated by the value of the first indicator or the value of the second indicator. This is merely an example of a manner of executing the row management policy. In actual application, the corresponding row management policy may be directly executed based on an indication of the first indicator or an indication of the second indicator without setting a timer. For details, refer to the related description of step 405.

The foregoing embodiment provides an adjustment manner for a case in which the first indicator and the second indicator are separately specified for each bank. In actual application, because a locality of a write access is poor, a fixed page policy may be used for the write access. For example, in one manner, a fixed row closing policy may be used, that is, a row accessed by using the write access is closed immediately after the write access is completely performed. In another case, a short row closing time may be set, and the row accessed by using the write access is closed when the time is reached. When the fixed row management policy is used for the write access, the second indicator may not be set. In this manner, only one first indicator may be specified for each bank.

Figure 7:
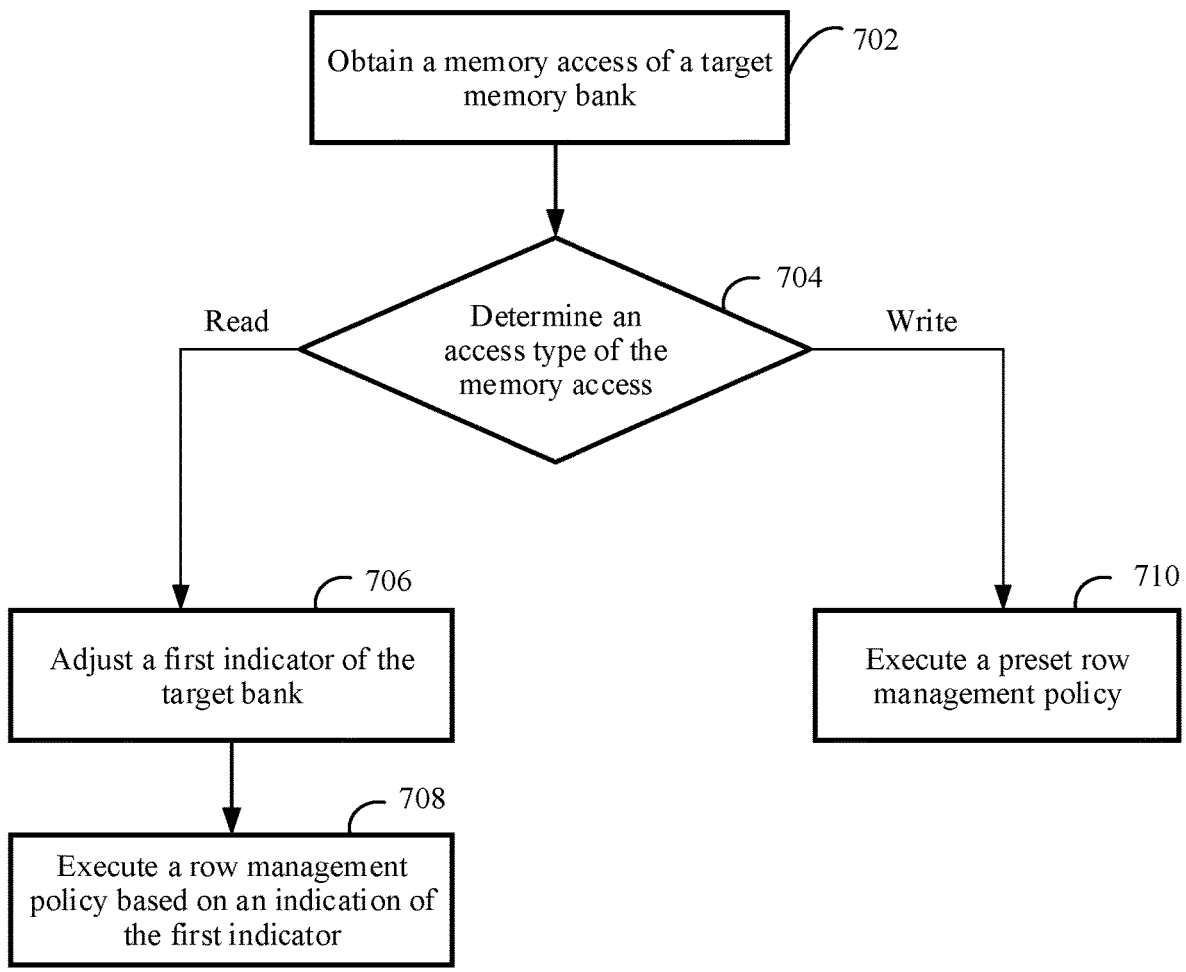
FIG. 7 is a flowchart of another memory management method according to an embodiment of the present disclosure.

FIG. 7 is a flowchart of another memory management method according to an embodiment of the present disclosure. The method may still be performed by the memory controller in the computer system shown in FIG. 1. The method may include the following steps.

Step 702: Obtain a memory access of a target memory bank. Similar to step 401, the memory access may include a read access or a write access. The obtained memory access may include information such as a read/write identifier, an address, and a request ID. In addition, if the memory access is a write access, the write access may further carry data to be written into a memory. Step 704: The memory controller may determine an access type of the memory access. The memory access includes a read access or a write access. In this step, the access type of the memory access may be determined based on the read/write identifier in the memory access. If the memory access is a read access, the method proceeds to step 706. If the memory access is a write access, the method proceeds to step 710.

Step 706: The memory controller adjusts a first indicator of the target bank based on a row hit status of a target row of the memory access. As described above, the row hit status may include a row hit, a row conflict, or row idle. In this embodiment of the present disclosure, the first indicator may be set to indicate a row management policy used after the read access is performed. In other words, whether to close the target row after the read access is performed may be determined based on an indication of the first indicator. In this step, the first indicator of the target bank may be adjusted based on the row hit status of the memory access, so that the row management policy of the target bank can be dynamically adjusted. For a specific adjustment method, refer to adjustment methods for the first indicator in FIG. 5A-1 and FIG. 5A-2 to FIG. 5D. Details are not described herein again.

Step 708: The memory controller executes the corresponding row management policy based on the indication of the first indicator. After the memory access is completely performed, the corresponding row management policy may be executed based on the indication of the first indicator. For example, the target row may be closed or kept in an open state based on the indication of the first indicator after the read access is performed, or the target row may be closed based on a time indicated by the first indicator. For this step, refer to the description of step 405. Details are not described herein again. It may be understood that, for execution of the corresponding row management policy based on the first indicator, refer to the description of how to execute the corresponding row management policy based on the indication of the first indicator in FIG. 6. Details are not described herein again.

Step 710: The memory controller executes a preset row management policy. In this embodiment of the present disclosure, considering that randomness of processing a write access by the memory controller is high, a fixed row management policy may be used. For example, a row accessed by using a write access may be closed after the write access is performed. In this step, the preset row management policy may not be adjusted when the write access is received, but when to close the target row is determined according to the preset row management policy after the write access is completely performed.

In the embodiment shown in FIG. 7, a read access and a write access in memory accesses are still distinguished. Because only the first indicator indicating the row management policy used after the read access is completely performed is set, a value of the first indicator may be adjusted based on only the received read access. For the received write access, because randomness of the write access is high, the preset row management policy may be used, and the preset row management policy may not be adjusted when the write access is received. It may be understood that, in comparison with the embodiment shown in FIG. 4B, in the embodiment shown in FIG. 7, when the read access is processed, the row management policy of the target bank may be dynamically adjusted based on a specified value of the first indicator, and the write access is processed according to the fixed row management policy. Because the fixed row management policy is used for the write access, a second indicator may not need to be specified for the bank, a hardware structure can be simpler, and an adjustment manner is simpler.

Figure 8:
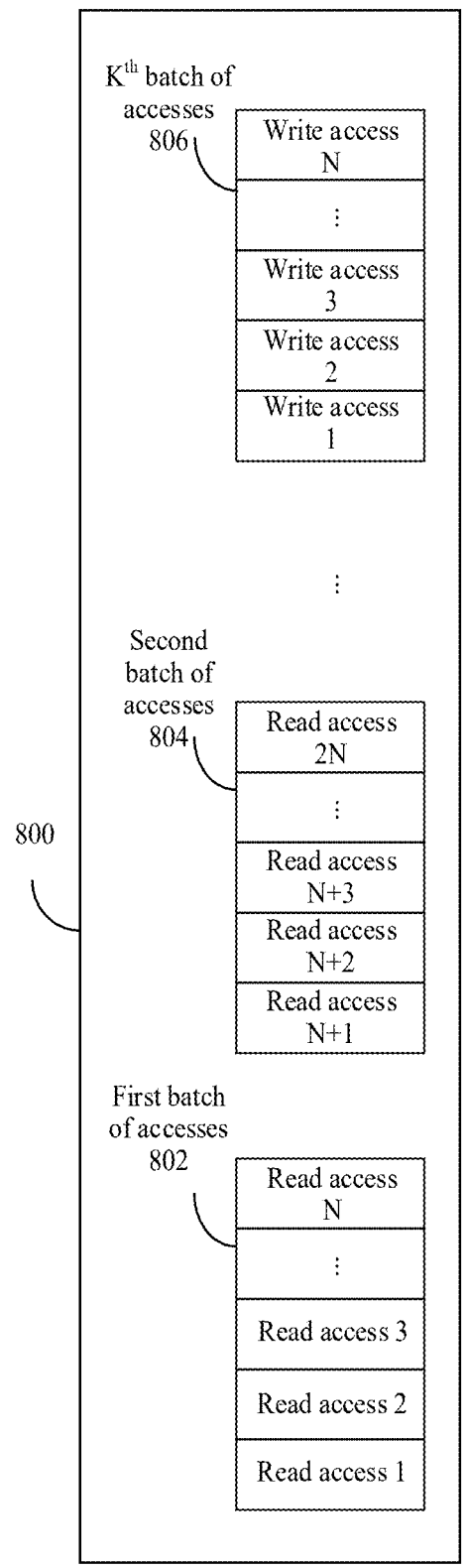
FIG. 8 is a schematic diagram of scheduling of a memory access according to an embodiment of the present disclosure.

A person skilled in the art learns that, because switching between different memory accesses of the target bank causes an access latency, in the method provided in this embodiment of the present disclosure, the memory controller may continually schedule, in a scheduling queue, a plurality of memory accesses for accessing a same bank. In addition, considering that switching between a plurality of consecutive read accesses and write accesses of a same row in a same bank also causes a latency, and there are different requirements for row management policies due to a difference between localities of the read access and the write access, in the following embodiment, the read accesses and the write accesses are further scheduled in batches. FIG. 8 is a schematic diagram of scheduling of a memory access according to an embodiment of the present disclosure. As shown in FIG. 8, a memory controller 106 may schedule memory access requests in batches. For example, a read access 1 to a read access N may be placed in a scheduling queue as a first batch of accesses 802, a read access N+1 to a read access 2N may be placed in the scheduling queue as a second batch of accesses 804, and a write access 1 to a write access N may be placed in the scheduling queue as a $K^{th}$ batch of accesses 806. Each batch may include a plurality of read accesses for accessing a same bank or a plurality of write accesses for accessing a same bank.

Figure 9:
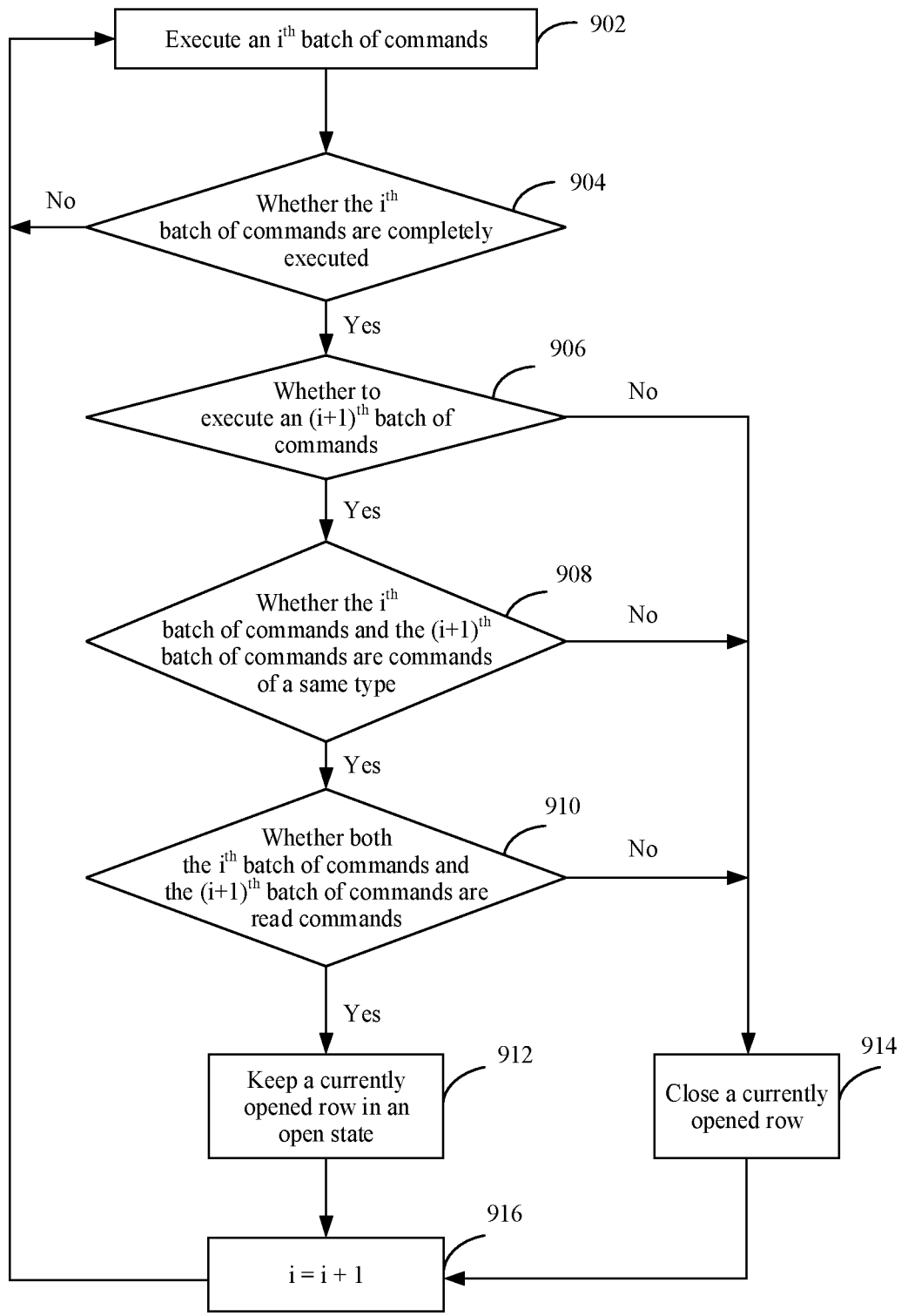
FIG. 9 is a flowchart of another memory management method according to an embodiment of the present disclosure.

In this scheduling mode, a row management policy of a bank may be further adjusted when different batches of accesses are performed, to reduce an access latency and reduce a waste of bus bandwidth caused by switching between different types of accesses. For a method for adjusting a row management policy during switching between different batches of accesses, refer to FIG. 9. FIG. 9 is a flowchart of another memory management method according to an embodiment of the present disclosure. As shown in FIG. 9, the method may include the following steps.

Step 902: A memory controller performs an $i^{th}$ batch of accesses. An initial value of i may be set to 1, and i is a natural number greater than or equal to 1. As described above, after receiving memory access requests, the memory controller places a plurality of received memory access requests in a buffer queue, and then schedules a memory access request in the buffer queue to a scheduling queue for separate execution. In this embodiment of the present disclosure, the memory controller may schedule the plurality of memory access requests to the scheduling queue in batches based on types of the memory access requests. For example, the memory controller may schedule the plurality of memory access requests to the scheduling queue in the manner of scheduling in batches shown in FIG. 8. In this step, the $i^{th}$ batch of accesses performed by the memory controller may be any batch of accesses shown in FIG. 8. For example, the $i^{th}$ batch of accesses may refer to the first batch of accesses 802, the second batch of accesses 804, or the $K^{th}$ batch of accesses 806.

Step 904: The memory controller determines whether the $i^{th}$ batch of accesses are completely performed. The memory controller may determine whether a performed access is a last access of the $i^{th}$ batch, to determine whether the $i^{th}$ batch of accesses are completely performed. Alternatively, the memory controller may determine, based on whether there is another access in the scheduling queue, whether the $i^{th}$ batch of accesses are completely performed. In addition, the memory controller may alternatively determine, in a counting manner, whether the $i^{th}$ batch of accesses are completely performed. A method for the memory controller to determine whether the $i^{th}$ batch of accesses are completely performed is not limited herein. If the $i^{th}$ batch of accesses are not completely performed, the method goes back to step 902, and the $i^{th}$ batch of accesses are continued to be performed. If the memory controller determines that the $i^{th}$ batch of accesses are completely performed, the method proceeds to step 904, and the memory controller further determines whether to perform an $(i+1)^{th}$ batch of accesses. The memory controller may determine, based on whether there is another access in the scheduling queue or the buffer queue, whether the $(i+1)^{th}$ batch of accesses need to be performed. If the $(i+1)^{th}$ batch of accesses need to be performed, the method proceeds to step 908. If it is determined that the $(i+1)^{th}$ batch of accesses do not need to be performed, it indicates that no other memory access needs to be performed, and the method proceeds to step 914.

Step 908: The memory controller determines whether the $i^{th}$ batch of accesses and the $(i+1)^{th}$ batch of accesses are memory accesses of a same type. In the embodiment shown in FIG. 9, because the memory controller schedules and performs memory accesses in batches based on types of the memory accesses, a same batch of memory accesses may be a plurality of memory access requests of a same type. Therefore, in this step, the memory controller may determine whether types of the $i^{th}$ batch of accesses and the $(i+1)^{th}$ batch of accesses are the same, for example, whether both the $i^{th}$ batch of accesses and the $(i+1)^{th}$ batch of accesses are read accesses or write accesses. If the $i^{th}$ batch of accesses and the $(i+1)^{th}$ batch of accesses are memory accesses of a same type, the method proceeds to step 910. If the $i^{th}$ batch of accesses and the $(i+1)^{th}$ batch of accesses are memory accesses of different types, the method proceeds to step 914.

Step 910: The memory controller further determines whether both the $i^{th}$ batch of accesses and the $(i+1)^{th}$ batch of accesses are read accesses. If both the $i^{th}$ batch of accesses and the $(i+1)^{th}$ batch of accesses are read accesses, the method proceeds to step 912. If the $i^{th}$ batch of accesses or the $(i+1)^{th}$ batch of accesses are write accesses, the method proceeds to step 914. Step 912: The memory controller keeps a currently opened row in an open state. In this embodiment of the present disclosure, because both the $i^{th}$ batch of accesses and the $(i+1)^{th}$ batch of accesses are read accesses, considering that the memory controller has a good locality in processing read accesses, in other words, there is a high probability that a plurality of commands for continually accessing a same row, if a row opened in a process of performing a previous batch of read accesses remains in the open state during switching, the row may be kept in the open state. For example, during switching between the first batch of accesses 802 and the second batch of accesses 804, if a row opened in a process of performing the first batch of accesses 802 remains in the open state, the row may be kept in the open state. Then, the method proceeds to step 916.

If it is determined in step 908 that the $i^{th}$ batch of accesses and the $(i+1)^{th}$ batch of accesses are memory accesses of different types, for example, the $i^{th}$ batch of accesses are write accesses, or the $(i+1)^{th}$ batch of accesses are write accesses. In this case, the memory controller needs to switch between the read access and the write access. In this embodiment of the present disclosure, considering a difference between localities of the read access and the write access, randomness of the write access is higher. To reduce a latency, during switching, the method may proceed to step 914, to close all rows opened in a process of performing the $i^{th}$ batch of accesses. For example, as shown in FIG. 8, after the second batch of accesses 804 are completely performed, switching is performed to perform a next batch of accesses. If the next batch of accesses of the second batch of accesses 804 are write accesses (for example, when the next batch of accesses are the $K^{th}$ batch of accesses 806), all rows opened in a process of performing the second batch of accesses 804 may be closed after the second batch of accesses 804 are completely performed. Then, the method proceeds to step 916 to perform the next batch of accesses.

If it is determined in step 910 that both the $i^{th}$ batch of accesses and the $(i+1)^{th}$ batch of accesses are write accesses, because the write access has high randomness and a poor locality, in this case, the method may alternatively proceed to step 914 to close all rows opened in a process of performing the $i^{th}$ batch of accesses. Then, the method proceeds to step 916 to switch to perform the $(i+1)^{th}$ batch of accesses. Step 916: Make i=i+1. The method goes back to step 902 to perform the next batch of memory accesses. This process is repeated until the plurality of batches of accesses that need to be performed are completely performed. It may be understood that a value of i cannot be greater than a total quantity of batches of to-be-performed accesses.

According to the memory management method provided in FIG. 9, because scheduling is performed in batches, a quantity of times of switching between the read access and the write access can be further reduced. In addition, because different row management policies can be used during switching between different batches of accesses, a row conflict that may be caused during switching between different batches can be further reduced, a latency caused by inappropriate closing of a memory row can be reduced, and a waste of bus bandwidth can be reduced.

It should be noted that, in actual application, an independent policy counter is not necessarily specified for each bank in some designs. Alternatively, a plurality of address segments may be obtained through division, and a policy counter is specified for each address segment. Alternatively, several banks may share a same group of policy counters. Each address segment may include addresses of a plurality of banks, or may include a part of addresses in one bank. In a design in which several banks share a group of policy counters, when a row management policy is adjusted, reference may be made to the foregoing embodiment to perform an operation on a policy counter corresponding to a bank to be accessed by using a memory access. According to these manners, in actual application, a same row management policy may be used for a plurality of banks, or a same row management policy may be used for a plurality of target row accesses corresponding to at least one address segment.

According to the memory management method provided in this embodiment of the present disclosure, a difference between localities of a read access and a write access in memory accesses is considered in a process of executing a memory row management policy, so that memory row management better complies with a characteristic of the memory access, a memory access latency is reduced, a waste of bandwidth is reduced, and memory access efficiency is improved.

In addition, a case in which data is written into a memory in a direct memory access (DMA) manner exists in actual application. An embodiment of the present disclosure further provides how to manage a memory row in a DMA read/write scenario. DMA read/write is usually read/write of a large data block, and a DMA is usually unidirectionally performed once. To ensure data consistency, a data block that is being accessed by using the DMA is usually not accessed by another source. DMA read and write operations have a good locality and are irrelevant to another request. Therefore, a memory access policy in a DMA scenario may be considered separately. For example, in actual application, a DMA memory access and a non-DMA memory access may be scheduled in batches. In addition, DMA memory accesses may be further classified into a DMA read access and a DMA write access for scheduling in batches.

For switching between non-DMA accesses, refer to the foregoing embodiment. For switching between a non-DMA access and a DMA access, after a current batch of memory accesses are completely performed, a row in a bank involved in the batch of memory accesses may be directly closed. For switching between DMA accesses, if switching is performed between different batches of memory accesses that belong to a same DMA operation, no matter whether types of two adjacent batches of DMA accesses are the same, a row in a bank involved in a currently completed DMA access may be kept in an open state during switching. If two adjacent batches of DMA accesses are not DMA accesses caused by a same DMA operation, no matter whether types of the two adjacent batches of DMA accesses are the same or whether an involved DMA access is a read access or a write access, a row in a bank involved in a currently completed DMA access may be closed during switching.

According to the memory management method provided in this embodiment of the present disclosure, a characteristic of a good locality of the DMA access and non-correlation between the DMA access and another memory access are considered, and the DMA access and the non-DMA memory access are distinguished and scheduled in batches. This avoids mutual interference between the DMA access and a common memory access, ensures a performance requirement of the DMA access, and reduces a memory access latency.

An embodiment of the present disclosure further provides a memory management apparatus. The memory management apparatus provided in this embodiment of the present disclosure may include at least a part of components in the computer system shown in FIG. 1. For example, at least one processor 102 and a memory controller 106 may be included.

In addition, an embodiment of the present disclosure further provides a memory controller. The memory controller includes a communications interface and a logic circuit that is configured to perform the memory management method in the foregoing embodiment. The communications interface is configured to receive a memory access sent by a processor of a computer system. The memory controller provided in this embodiment of the present disclosure may be shown as the memory controller 106 in FIG. 1.

Figure 10:
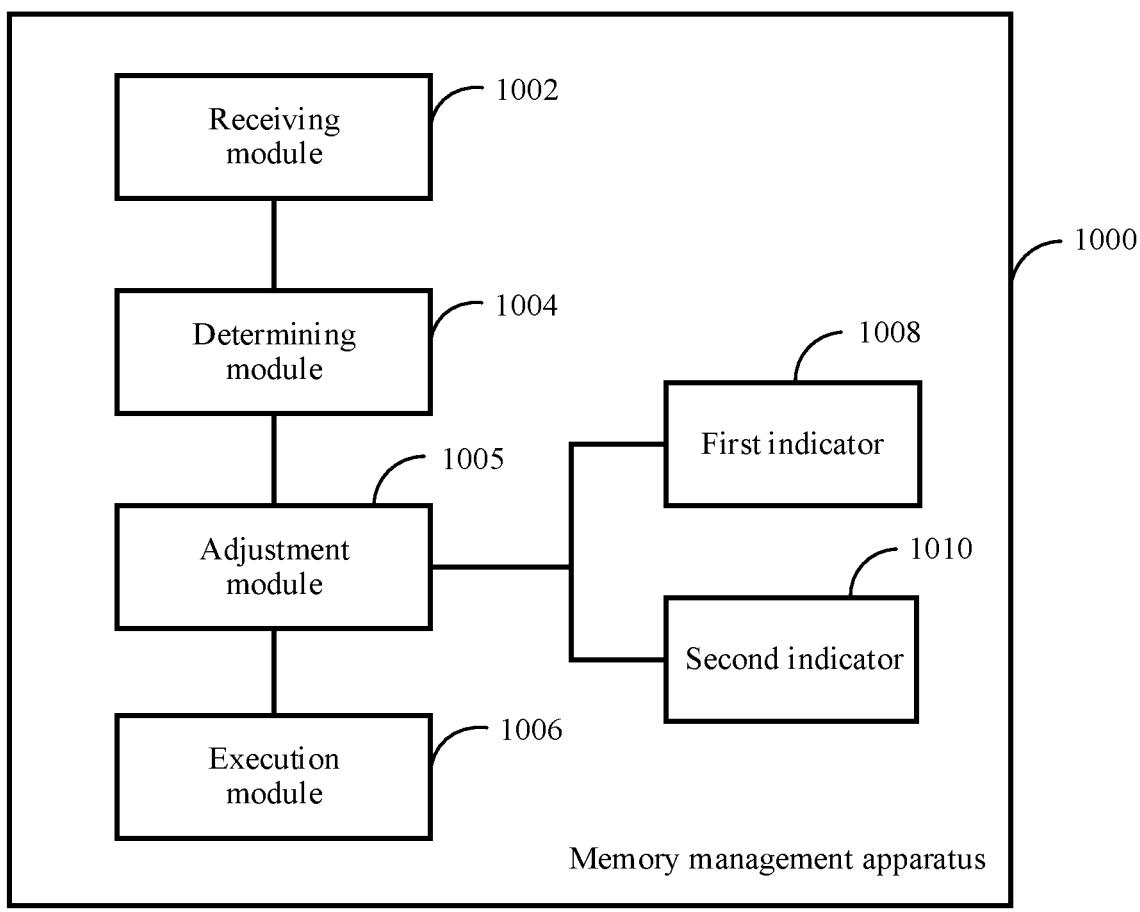
FIG. 10 is a schematic diagram of a memory management apparatus according to an embodiment of the present disclosure.

FIG. 10 is a schematic diagram of another memory management apparatus according to an embodiment of the present disclosure. As shown in FIG. 10, the memory management apparatus may include a receiving module 1002, a determining module 1004, and an execution module 1006. The receiving module 1002 is configured to receive a memory access, where the memory access may be used for accessing a target row in a target memory bank. The determining module 1004 is configured to determine an access type of the memory access. The execution module 1006 is configured to execute a row management policy corresponding to the access type.

In a possible case, the memory management apparatus may further include an adjustment module 1005. The adjustment module 1005 is configured to adjust the row management policy based on the access type of the memory access and a row hit status of the target row. The row hit status includes at least one of the following states: a row hit, a row conflict, and row idle.

In a possible case, the memory management apparatus may further include a first indicator 1008. When the memory access is a read access, the adjustment module 1005 is configured to adjust the first indicator 1008 of the target memory bank based on the row hit status of the target row, where the first indicator indicates whether to close the target row after the read access is performed. In other words, the first indicator indicates a row management policy that is of the target memory bank and that is used after the read access is performed. Therefore, the execution module 1006 may execute the row management policy of the target memory bank based on the first indicator 1008. Adjusting the first indicator 1008 may be understood as adjusting the row management policy used after the read access is performed.

In a possible case, the memory management apparatus may further include a second indicator 1010. When the memory access is a write access, the adjustment module 1005 may adjust the second indicator 1010 of the target memory bank based on the row hit status of the target row, where the second indicator indicates whether to close the target row after the write access is performed. The execution module 1006 may execute the row management policy of the target memory bank based on an indication of the second indicator 1010. Adjusting the second indicator 1010 may be understood as adjusting a row management policy used after the write access is performed.

In another possible case, only the first indicator 1008 may be set, but the second indicator 1010 is not set. The execution module 1006 may directly execute a preset row management policy for a received write access. In this case, the preset row management policy corresponding to the write access may not be adjusted. In another possible case, the second indicator 1010 may alternatively be set, but the second indicator 1010 indicates the preset row management policy corresponding to the write access, and the preset row management policy does not need to be adjusted based on a row hit status of the received write access.

In a possible case, when the adjustment module 1005 adjusts the first indicator 1008 or the second indicator 1010 based on the row hit status of the target row, if the memory access causes a row hit, the adjustment module 1005 adjusts the first indicator or the second indicator to a first indication, where the first indication indicates that the target row is not closed or the target row is kept in an open state. If the memory access causes a row conflict, the adjustment module 1005 adjusts the first indicator or the second indicator to a second indication, where the second indication indicates that the target row is closed.

In another possible case, when the adjustment module 1005 adjusts the first indicator 1008 or the second indicator 1010 based on the row hit status of the target row, if the memory access causes row idle, the adjustment module 1005 determines whether the memory access may cause a row hit. If the memory access may cause a row hit, the adjustment module 1005 adjusts the first indicator or the second indicator to the first indication, where the first indication indicates that the target row is not closed or the target row is kept in the open state, and that a row hit may be caused means that a row hit is caused if a last opened row in the target memory bank is not closed. If the memory access may cause a row conflict, the adjustment module 1005 adjusts the first indicator or the second indicator to the second indication, where the second indication indicates that the target row is closed, and that a row conflict may be caused means that a row conflict is caused if a last opened row in the target memory bank is not closed.

In another case, when the adjustment module 1005 adjusts the first indicator 1008 or the second indicator 1010 based on the row hit status of the target row, the adjustment module 1005 may adjust the first indicator or the second indicator based on the row hit status of the target row and an access type of a previous memory access of the memory access.

For details about how the adjustment module 1005 adjusts the first indicator 1008 or the second indicator 1010, refer to the description in the foregoing method embodiment. Details are not described herein again.

In another case, if the memory access belongs to a first batch of memory accesses, the execution module 1006 is further configured to determine that the first batch of memory accesses are completely performed and a second batch of memory accesses are to be performed; and close the target row if an access type of the first batch of memory accesses is different from an access type of the second batch of memory accesses; keep the target row in the open state if both the first batch of memory accesses and the second batch of memory accesses are read accesses; or close the target row if both the first batch of memory accesses and the second batch of memory accesses are write accesses.

It may be understood that the memory management apparatus provided in this embodiment of the present disclosure may be the memory controller shown in FIG. 1 or integrated in the memory controller shown in FIG. 1. For implementation of each functional module in the memory management apparatus, refer to the corresponding description in the foregoing embodiment. Details are not described herein again.

According to the memory management apparatus provided in this embodiment of the present disclosure, when a row management policy of a memory row in a DRAM is executed, a difference between localities of different access types is fully considered, a corresponding row management policy is executed based on an access type, and the corresponding row management policy may be adjusted based on a row hit status of a memory access, so that a characteristic of the memory access can be fully considered in memory row management, management can be more accurate, a memory access latency caused by an inappropriate row management policy can be reduced, and memory access efficiency can be improved.

An embodiment of the present disclosure further provides a computer program product for performing a memory management method. The computer program product includes a computer-readable storage medium storing program code. Instructions included in the program code are used for performing the method process described in any one of the foregoing method embodiments. A person of ordinary skill in the art may understand that the foregoing storage medium may include any non-transitory machine-readable medium capable of storing program code, such as a Universal Serial Bus (USB) flash drive, a removable hard disk, a magnetic disk, an optical disc, a random-access memory (RAM), a solid-state drive (SSD), or a non-volatile memory.

It should be noted that the embodiments provided in this disclosure are merely examples. A person skilled in the art may clearly know that, for convenience and conciseness of description, in the foregoing embodiments, the embodiments emphasize different aspects, and for a part not described in detail in one embodiment, refer to related descriptions in another embodiment. Features disclosed in embodiments, claims, and accompanying drawings of the present disclosure may exist independently or exist in a combination. Features described in a hardware form in embodiments of the present disclosure may be executed by software, and vice versa. This is not limited herein.

What is claimed is:

1. A method, comprising:
    obtaining a memory access corresponding to a target memory bank, wherein the target memory bank is one of a plurality of memory banks in a memory, wherein the plurality of memory banks corresponds to a plurality of different row management policies, wherein the memory access comprises a first access type and belongs to a first batch of memory accesses, and wherein the first access type comprises a read access or a write access;
    executing, according to the first access type and according to one of the plurality of different row management policies corresponding to the target memory bank, the one of the plurality of different row management policies;
    identifying that the first batch is completely performed and that a second batch of memory accesses is to be performed;
    closing a target row when a second access type of the first batch is different from a third access type of the second batch;
    keeping the target row in an open state when both the first batch and the second batch are read accesses; and
    closing the target row when both the first batch and the second batch are write accesses.

2. The method of claim 1, wherein the memory access is for accessing the target row in the target memory bank in the memory.

3. The method of claim 2, further comprising adjusting, based on the first access type and a row hit status of the target row, the one of the plurality of different row management polices corresponding to the target memory bank.

4. The method of claim 3, wherein when the memory access is the read access, adjusting, based on the first access type and the row hit status, the one of the plurality of different row management policies comprises adjusting, based on the row hit status, a first indicator of the target memory bank, and wherein the first indicator indicates whether to close the target row after the read access is performed.

5. The method of claim 4, wherein when the memory access is the write access, adjusting, based on the first access type and the row hit status, the one of the plurality of different row management policies comprises adjusting, based on the row hit status, a second indicator of the target memory bank, and wherein the second indicator indicates whether to close the target row after the write access is performed.

6. The method of claim 4, wherein when the memory access is the write access, adjusting, based on the first access type and the row hit status, the one of the plurality of different row management policies comprises identifying that the one of the plurality of different row management policies is a preset row management policy corresponding to the write access, and wherein the preset row management policy indicates whether to close the target row after the write access is performed.

7. The method of claim 4, wherein the row hit status comprises a row hit or a row conflict, and wherein adjusting, based on the row hit status, the first indicator comprises:
adjusting the first indicator to a first indication when the memory access has a row hit status, wherein the first indication indicates that the target row is not closed or the target row is kept in the open state; and
adjusting the first indicator to a second indication when the memory access has a row conflict status, wherein the second indication indicates that the target row is closed.

8. The method of claim 4, wherein the row hit status comprises row idle, and wherein adjusting, based on the row hit status, the first indicator comprises:
identifying whether the memory access may have had a row hit status when the memory access has a row idle status;
adjusting the first indicator to a first indication when the memory access may have the row hit status, wherein the first indication indicates that the target row is not closed or the target row is kept in the open state, and wherein the memory access may have the row hit status when a last opened row in the target memory bank is not closed; and
adjusting the first indicator to a second indication when the memory access may have a row conflict status, wherein the second indication indicates that the target row is closed, and wherein the memory may have the row conflict status when the last opened row is not closed.

9. The method of claim 4, further comprising identifying a fourth access type of a previous memory access of the memory access, wherein adjusting, based on the row hit status, the first indicator comprises adjusting, based on the row hit status and the fourth access type, the first indicator.

10. An apparatus, comprising:
one or more processors configured to send a memory access corresponding to a target memory bank, wherein the target memory bank is one of a plurality of memory banks in a memory, wherein the plurality of memory banks corresponds to a plurality of different row management policies, wherein the memory access comprises a first access type and belongs to a first batch of memory accesses, and wherein the first access type comprises a read access or a write access; and
a memory controller coupled to the one or more processors and configured to:
obtain the memory access from the processor;
execute, according to the first access type and according to one of the plurality of different row management policies corresponding to the target memory bank, the one of the plurality of different row management policies;
identify that the first batch is completely performed and that a second batch of memory accesses is to be performed;
close a target row when a second access type of the first batch is different from a third access type of the second batch;
keep the target row in an open state when both the first batch and the second batch are read accesses; and
close the target row when both the first batch and the second batch are write accesses.

11. The apparatus of claim 10, wherein the memory access is for accessing the target row in the target memory bank in the memory.

12. The apparatus of claim 11, wherein the memory controller is further configured to adjust, based on the first access type and a row hit status of the target row, the one of the plurality of different row management policies corresponding to the target memory bank.

13. The apparatus of claim 12, wherein the memory controller is further configured to adjust, based on the row hit status, a first indicator of the target memory bank, and wherein the first indicator indicates whether to close the target row after the read access is performed.

14. The apparatus of claim 13, wherein the memory controller is further configured to adjust, based on the row hit status, a second indicator of the target memory bank when the memory access is the write access, and wherein the second indicator indicates whether to close the target row after the write access is performed.

15. The apparatus of claim 13, wherein the memory controller is further configured to identify that a row management policy is a preset row management policy corresponding to the write access when the first access type is the write access, and wherein the preset row management policy indicates whether to close the target row after the write access is performed.

16. The apparatus of claim 13, wherein the row hit status comprises a row hit or a row conflict, and wherein the memory controller is further configured to:
adjust the first indicator to a first indication when the memory access has a row hit status, wherein the first indication indicates that the target row is not closed or the target row is kept in the open state; and
adjust the first indicator to a second indication when the memory access has a row conflict status, wherein the second indication indicates that the target row is closed.

17. A memory controller, comprising:
a communications interface configured to receive a memory access from a processor of a computer system, wherein the memory access corresponds to a target memory bank, wherein the target memory bank is one of a plurality of memory banks in a memory, wherein the plurality of memory banks corresponds to a plurality of different row management policies, wherein the memory access comprises a first access type and belongs to a first batch of memory accesses, and wherein the first access type comprises a read access or a write access; and
a logic circuit coupled to the communication interface and configured to:
obtain the memory access from the communications interface;
execute, according to the first access type and according to one of the plurality of different row management policies corresponding to the target memory bank, the one of the plurality of different row management policies;
identify that the first batch is completely performed and that a second batch of memory accesses is to be performed;
close a target row when a second access type of the first batch is different from a third access type of the second batch;
keep the target row in an open state when both the first batch and the second batch are read accesses; and
close the target row when both the first batch and the second batch are write accesses.

18. The memory controller of claim 17, wherein the memory access is for accessing the target row in the target memory bank in the memory.

19. The memory controller of claim 18, wherein the logic circuit is further configured to adjust, based on the first access type and a row hit status of the target row, the one of the plurality of different row management policies corresponding to the target memory bank.

20. The memory controller of claim 19, wherein when the memory access is the read access, the logic circuit is further configured to adjust, based on the first access type and the row hit status, the one of the plurality of different row management policies by adjusting, based on the row hit status, a first indicator of the target memory bank, and wherein the first indicator indicates whether to close the target row after the read access is performed.

* * * * *